(12) United States Patent
Love et al.

(10) Patent No.: US 8,934,500 B2
(45) Date of Patent: Jan. 13, 2015

(54) METHOD AND APPARATUS USING TWO RADIO ACCESS TECHNOLOGIES FOR SCHEDULING RESOURCES IN WIRELESS COMMUNICATION SYSTEMS

(75) Inventors: Robert T. Love, Barrington, IL (US); Ajit Nimbalker, Buffalo Grove, IL (US); Ravikiran Nory, Buffalo Grove, IL (US); Kenneth A. Stewart, Grayslake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 125 days.

(21) Appl. No.: 13/086,221

(22) Filed: Apr. 13, 2011

(65) Prior Publication Data

US 2012/0263118 A1 Oct. 18, 2012

(51) Int. Cl.
 *H04J 3/16* (2006.01)

(52) U.S. Cl.
 USPC .......................................................... 370/466

(58) Field of Classification Search
 CPC ..... H04W 88/06; H04W 36/14; H04W 48/18; H04W 24/10; H04W 36/24; H04W 48/08; H04W 52/0206; H04W 72/042; H04W 52/146; H04W 72/0413; H04W 72/04
 USPC ................................................. 370/466, 467
 See application file for complete search history.

(56) References Cited

U.S. PATENT DOCUMENTS

| | | | |
|---|---|---|---|
| 5,155,448 A | 10/1992 | Powell | |
| 6,041,081 A | 3/2000 | O et al. | |
| 6,160,449 A | 12/2000 | Klomsdorf et al. | |
| 6,166,598 A | 12/2000 | Schlueter | |
| 6,175,550 B1 | 1/2001 | van Nee | |
| 6,281,748 B1 | 8/2001 | Klomsdorf et al. | |
| 6,311,046 B1 | 10/2001 | Dent | |
| 6,516,196 B1 | 2/2003 | Chen et al. | |
| 6,611,676 B2 | 8/2003 | Ue et al. | |
| 6,631,268 B1 | 10/2003 | Lilja | |
| 6,751,444 B1 | 6/2004 | Meiyappan | |

(Continued)

FOREIGN PATENT DOCUMENTS

| | | |
|---|---|---|
| EP | 1271769 A2 | 6/2002 |
| WO | 0118987 A1 | 3/2001 |

(Continued)

OTHER PUBLICATIONS

3GPP TSG RAN WG1 #43bis, R1-06xxxx "UE Power Management for EUTRA" Motorola, Helsinki, Finland, Jan. 23-25, 2005, 5 pages.

(Continued)

*Primary Examiner* — Fan Ng
(74) *Attorney, Agent, or Firm* — Lerner, David, Littenberg, Krumholz & Mentlik, LLP

(57) ABSTRACT

In a method for scheduling resources, the method includes receiving a first control channel in a first subframe (426) as a part of wireless communication between a user equipment (102) and a network equipment (110) using a first type of radio access technology wherein the first control channel (408) includes a first scheduling grant for scheduling resources in a second subframe (424) using a second type of radio access technology. The method also includes receiving a second control channel in the first subframe using the first type of radio access technology wherein the second control channel includes a second scheduling grant for the scheduling resources in the first subframe using the first type of radio access technology.

8 Claims, 10 Drawing Sheets

(56) References Cited

U.S. PATENT DOCUMENTS

| | | |
|---|---|---|
| 6,944,460 B2 | 9/2005 | Haartsen |
| 6,983,026 B2 | 1/2006 | Pinckley et al. |
| 6,985,704 B2 | 1/2006 | Yang et al. |
| 7,069,577 B2 | 6/2006 | Geile |
| 8,310,921 B2 | 11/2012 | Cho et al. |
| 2002/0172160 A1 | 11/2002 | Moulsley |
| 2004/0082335 A1 | 4/2004 | Hirayama et al. |
| 2004/0109424 A1 | 6/2004 | Chheda |
| 2004/0185868 A1 | 9/2004 | Jain et al. |
| 2004/0212428 A1 | 10/2004 | Ode et al. |
| 2005/0030953 A1 | 2/2005 | Vasudevan et al. |
| 2005/0245264 A1 | 11/2005 | Laroia et al. |
| 2007/0037594 A1* | 2/2007 | Palenius et al. ............... 455/502 |
| 2008/0025254 A1 | 1/2008 | Love et al. |
| 2009/0042532 A1 | 2/2009 | Bienas et al. |
| 2009/0046693 A1 | 2/2009 | Nory et al. |
| 2009/0175235 A1 | 7/2009 | Spinar et al. |
| 2009/0247172 A1 | 10/2009 | Palanki et al. |
| 2009/0262692 A1 | 10/2009 | Olszewski |
| 2010/0015967 A1 | 1/2010 | Perets et al. |
| 2010/0054161 A1 | 3/2010 | Montojo et al. |
| 2010/0120424 A1 | 5/2010 | Johansson et al. |
| 2010/0172428 A1 | 7/2010 | Pani et al. |
| 2010/0215011 A1 | 8/2010 | Pan et al. |
| 2010/0227569 A1 | 9/2010 | Bala et al. |
| 2010/0234040 A1 | 9/2010 | Palanki |
| 2010/0254329 A1 | 10/2010 | Pan et al. |
| 2010/0302983 A1 | 12/2010 | McBeath et al. |
| 2010/0303036 A1 | 12/2010 | McBeath et al. |
| 2010/0304689 A1 | 12/2010 | McBeath et al. |
| 2010/0316146 A1 | 12/2010 | McBeath et al. |
| 2010/0317360 A1 | 12/2010 | McBeath et al. |
| 2010/0322158 A1 | 12/2010 | Lee et al. |
| 2010/0323744 A1 | 12/2010 | Kim et al. |
| 2010/0323745 A1 | 12/2010 | Chen et al. |
| 2010/0331030 A1 | 12/2010 | Nory et al. |
| 2011/0019596 A1 | 1/2011 | Li et al. |
| 2011/0026473 A1 | 2/2011 | Luo |
| 2011/0044218 A1 | 2/2011 | Kaur |
| 2011/0076962 A1 | 3/2011 | Chen et al. |
| 2011/0194523 A1 | 8/2011 | Chung |
| 2011/0207490 A1* | 8/2011 | Lee et al. ...................... 455/509 |
| 2011/0230144 A1 | 9/2011 | Siomina et al. |
| 2011/0243090 A1 | 10/2011 | Grovlen |
| 2011/0280141 A1* | 11/2011 | Chin et al. .................... 370/252 |
| 2012/0113806 A1 | 5/2012 | Gong et al. |
| 2012/0163250 A1* | 6/2012 | Chin et al. .................... 370/280 |
| 2012/0263047 A1 | 10/2012 | Love et al. |
| 2012/0263117 A1 | 10/2012 | Love et al. |
| 2013/0142268 A1 | 6/2013 | Gao et al. |
| 2013/0165132 A1 | 6/2013 | Goedken et al. |

FOREIGN PATENT DOCUMENTS

| | | |
|---|---|---|
| WO | 03088520 A1 | 10/2003 |
| WO | 2004077664 A1 | 9/2004 |
| WO | 2005018114 A1 | 2/2005 |
| WO | 2007087482 A2 | 8/2007 |
| WO | 2007087483 A2 | 8/2007 |
| WO | 2008035171 A2 | 3/2008 |
| WO | 2008157692 A2 | 12/2008 |
| WO | 2010054605 A1 | 5/2010 |
| WO | 2010105232 A1 | 9/2010 |
| WO | 2011032035 A2 | 3/2011 |
| WO | 2012150887 A1 | 11/2012 |

OTHER PUBLICATIONS

Japanese Patent Office, Office Action for Japanese Patent Application No. P2009-521890 dated May 29, 2012, 2 pages.
United States Patent and Trademark Office, "Non-Final Rejection" for U.S. Appl. No. 11/459,683 Aug. 16, 2012, 12 pages.
Patent Cooperation Treaty, "PCT Search Report and Written Opinion of the International Searching Authority" for International Application No. PCT/US2012/030675 Aug. 28, 2012, 23 pages.
3GPP TS 36.211 V10.1.0 (Mar. 2011) 3rd Generation Partnership Project; Technical Specification Group Radio Access Network; Evolved Universal Terrestrial Radio Access (E-UTRA); Physical Channels and Modulation (Release 10), 103 pages.
Draft 3GPP TS 36.212 v10.1.0 (Mar. 2011) 3rd Generation Partnership Project; Technical Specification Group Radio Access Network; Evolved Terrestrial Radio Access (E-UTRA); Multiplexing and channel coding (Release 10), 76 pages.
3GPP TSG RAN WG1, R1-094863 "PCFICH for Multicarrier Operation" Qualcomm Europe; Jeju, Korea, Nov. 9-13, 2009, 4 pages.
3GPP: ETSI TS 125 309 V6.6.0; Mar. 2006, 36 pages.
Patent Cooperation Treaty, International Search Report and Written Opinion of the International Searching Authority for International Application No. PCT/US2010/030825, Mar. 8, 2013 11 pages.
Yang Li et al.: "LTE power amplifier module design: Challenges and trends", 2010 105H IEEE International Conference on Soldi-State and Integrated Circuit Technology, Nov. 1, 2010, pp. 192-195.
Patent Cooperation Treaty, International Search Report and Written Opinion of the International Searching Authority for International Application No. PCT/US2013/070654, Feb. 24, 2014, 11 pages.
United States Patent and Trademark Office, "Non-Final Rejection" for U.S. Appl. No. 13/086,203 dated Jun. 21, 2013, 24 pages.
International Search Report and Written Opinion for International Application No. PCT/US2012/030682 dated Jul. 4, 2012, 11 pages.

* cited by examiner

METHOD AND APPARATUS USING TWO RADIO ACCESS TECHNOLOGIES FOR SCHEDULING RESOURCES IN WIRELESS COMMUNICATION SYSTEMS

CROSS REFERENCE TO RELATED CASES

This application is related to applicants' patent applications entitled Method and Apparatus to Adjust the Control Region of a Subframe for Reducing Interference Between Channels in Wireless Communication Systems Ser. No. 13/086,203 and Method and Apparatus to Detect the Transmission Bandwidth Configuration of a Channel in Connection with Reducing Interference between Channels in Wireless Communication Systems Ser. No. 13/086,211 that are both filed concurrently with this application.

FIELD OF THE INVENTION

The present disclosure relates generally to wireless communications, and more particularly to alleviating a desensing of receivers operating in uplink or downlink channels when a frequency separation known as a guard band or separation region between the uplink and downlink channels is relatively small.

BACKGROUND

In wireless communication systems that are based on 3G and 4G principles such as Long Term Evolution, an uplink channel and a downlink channel are separated by a guard band. The guard band is designed to be sufficiently large enough (e.g., >2× the channel bandwidth) so that interference caused by transmissions on the uplink and the downlink channels to receivers deployed in those channels is reduced to acceptable levels or below required levels that avoid significantly degrading their operation. A receiver on one channel becomes desensed when interference power in time and frequency from a nearby transmitter on another channel exceeds the ability of the receiver to reject that interference. The receiver can reject interference that is at low enough levels such that they do not impair receiver functions. Thus, the receiver has the ability to properly decode control signals and packet transmissions. With carrier aggregation, a wireless carrier has access to additional frequency spectrum that can be used for either the uplink or the downlink channels. By using the additional frequency spectrum as either the uplink or the downlink channels, the guard band can be reduced.

This reduction can increase the interference during transmissions of signals on the uplink or downlink channels. At least in those situations when transmissions on the uplink or downlink channels occur simultaneously and near or proximate, in terms of geographical as well as RF location and frequency, to receivers operating in corresponding channels adjacent to the uplink or downlink channels used for transmission, the interference may desense the user equipment and network equipment receivers operating in the adjacent channels such that it is difficult to decode signals on the control channel or the shared (data) channel. To achieve greater spectrum efficiency of existing allocated transmission bandwidth configurations and the additional configurations that are used as channels for various radio access technologies, the interference causing the desense issue needs to be reduced

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
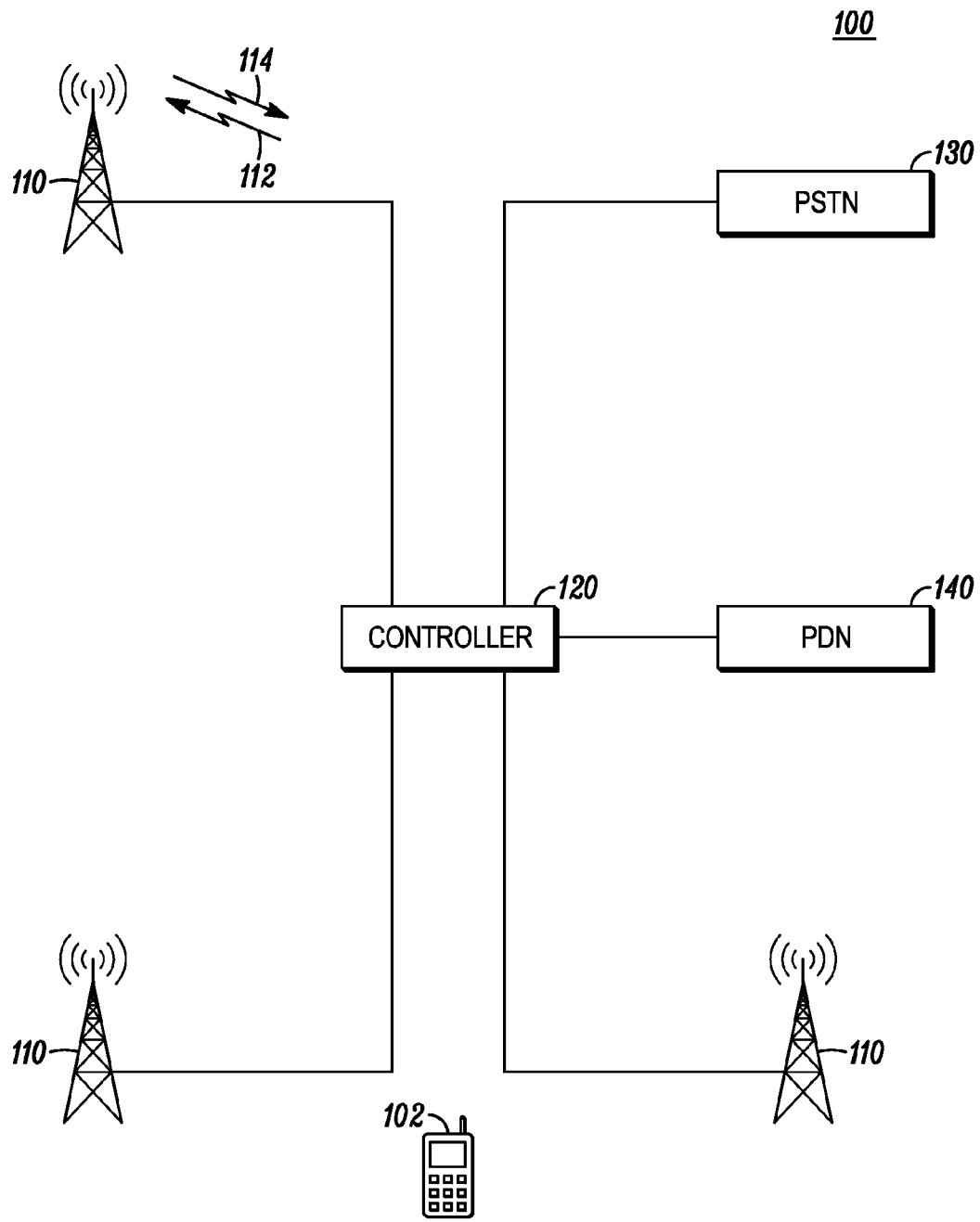
FIG. 1 is an example of a wireless communication system that is used in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to reducing desensing between uplink and downlink channels in a wireless communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions to reduce desensing between the uplink and downlink channels as described herein. The non-processor circuits may include, but are not limited to, a radio receiver, a radio transmitter, signal drivers, clock circuits, power source circuits, and user input devices. As such, these functions may be interpreted as steps of a method to reduce the desensing. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

A carrier (or channel) has a channel bandwidth (e.g., 1.4, 3, 5, 10, 15, or 20 MHz for LTE) and a occupied or allocable channel bandwidth (in MHz) which is smaller than the channel bandwidth. The allocable channel bandwidth is 90% of the channel bandwidth in LTE with the remaining 10% used for guard bands. The channel bandwidth is also referred to as the system bandwidth. The allocable channel bandwidth is also denoted as a transmission bandwidth configuration and is given in terms of the available (allocable) frequency resources in a given subframe which in LTE is given in terms of resource blocks (RBs). In Rel-8 LTE, there are 6 different transmission bandwidth configurations having transmission bandwidths of 6, 15, 25, 50, 75, or 100 RBs. The set of allocable resources can be allocated in subsets to one or more UEs. In LTE, each RB consists of 12 contiguous subcarriers and in time spans 6 or 7 OFDM symbols of a subframe depending on the cyclic prefix length used where a RB block pair (2 resource blocks occupying the same frequency but different and adjacent time (symbol) intervals) spans an entire 1 ms subframe. The term "frequency span" is equivalent to the bandwidth or frequency extent of the "transmission bandwidth configuration" where as previously explained the bandwidth of the "transmission bandwidth configuration" can also be called the transmission bandwidth. The frequency extent (or bandwidth) of the set of assigned resources taken from the transmission bandwidth configuration resources via an uplink scheduling grant or a downlink scheduling assignment (also referred to as a downlink scheduling grant) is denoted as an "active transmission bandwidth".

In order to address the interference and desensing issues that are caused by a reduced guard band between an uplink and downlink channel, numerous methods are developed that can be used in scheduling and receiving different transmission bandwidth configurations in a subframe where each transmission bandwidth configuration has a distinct bandwidth (denoted as transmission bandwidth) that encompasses in frequency the allocable resources for that channel. In addition, different methods are developed to determine or detect the differences scheduled for the different transmission bandwidth configurations in a subframe. In a method of scheduling, a subframe is communicated between a user equipment and network equipment wherein the subframe has a first transmission bandwidth configuration. The transmission bandwidth configuration regarding the downlink includes a control region formed from the first n OFDM symbols of a subframe and a plurality of resource blocks formed by the remaining OFDM symbols of the subframe. In another embodiment, the transmission bandwidth configuration includes a plurality of resource blocks and at least one of the resource blocks is configured as a control region.

In an embodiment a control channel in the control region consists of at least one resource element in the control region. In another embodiment a control channel in the control region consists of at least one resource group which consists of some number of resource elements in the control region. The control region includes an indicator that is used for scheduling a subsequent subframe. The method also uses the indicator to determine a second transmission bandwidth configuration for the subsequent subframe. The transmission bandwidth, also called the frequency span, of the indicated second transmission bandwidth configuration contains the subcarriers in the subsequent subframe that can be allocated. Communication in the subsequent subframe using the transmission bandwidth from the indicator for the second transmission bandwidth configuration.

In an embodiment, the communicating steps of the method include a user equipment receiving in the subframe that includes the indicator in the control region and receiving in the subsequent subframe that has a second transmission bandwidth configuration having the transmission bandwidth set by the indicator. The indicator can be configured so that the subsequent subframe mutes one or more resource elements (subcarriers) or a set of resource element groups in the subsequent subframe thereby reducing the number of allocable resource element groups and subcarriers in the second transmission bandwidth configuration. The muted number of resource element groups can be determined from the uplink resource allocations found in the control region of the subframe. In addition, the received control region can include determining a set of control channel elements using the uplink resource allocation in the subframe and detecting the control region for the control channel elements.

A method of detecting different frequency spans is also disclosed. In this method a subframe is received where the subframe is a part of wireless communication between a user equipment and a network equipment. A first set of control channel elements forming one or more control channels in the control region are monitored using a first transmission bandwidth of a first transmission bandwidth configuration. A second set of control channel elements forming one or more control channels in the control region are monitored using a second transmission bandwidth for a second transmission bandwidth configuration. The control region bandwidth is detected in one of the monitored first set or second set of control channel elements. In an embodiment, a control channel (e.g., a Packet Downlink Control Channel (PDCCH) in LTE) based on the first or second set of control channel elements detected. In another embodiment the transmission bandwidth configuration (and hence its transmission bandwidth) is detected in one of the monitored first set or second set of control channel elements. A subframe transmission bandwidth is determined from the transmission bandwidth used for the detected control channel of one of the first set of control candidates or the second set of control channel candidates.

A method for determining system bandwidth in a subframe is disclosed. In this embodiment, a first set of PDCCH candidates (i.e., multiple predefined sets of control resources in the control region known to a user equipment where each set may or may not be used by the serving cell for transmitting a PDCCH to the user equipment) is monitored in a subframe assuming a first control region bandwidth, and a second set of PDCCH candidates is monitored in the subframe assuming a second control region bandwidth. A PDCCH in either the first or second set of PDCCH candidates is detected (i.e., successfully decoded). Based on the set of PDCCH candidates in which the PDCCH is detected, the system bandwidth in the subframe is determined. In an embodiment, based on the set of PDCCH candidates in which the PDCCH is detected the system bandwidth of the control region in the subframe is determined. In another embodiment, based on the set of PDCCH candidates in which the PDCCH is detected the transmission bandwidth configuration for the subframe is determined.

Another method of scheduling to avoid the desensing is disclosed. This method includes network equipment determining interference in a receiver of a user equipment occurring in a first transmission bandwidth configuration of a subframe. The interference may be caused by communication based on a second transmission bandwidth configuration in the subframe. The method also includes adjusting, such as reducing, the power level of at least one subcarrier in a control channel in the first transmission bandwidth configuration to avoid the interference caused by the communication based on the second transmission bandwidth configuration. In an embodiment, the determination is made in a subframe that the interference will occur in a subsequent subframe. In addition, the method can include adjusting the power level of at least one subcarrier in the control region of a second transmission bandwidth configuration in the subframe.

Yet another method of scheduling to avoid the desensing is disclosed. The method includes receiving a first control channel or control region in a first subframe as a part of wireless communication between a user equipment and a network equipment using a first type of radio access technology. The first control channel or control region and the subframe have a first transmission bandwidth configuration, and the control channel or control region includes a grant for scheduling resources in a second subframe that uses a second type of radio access technology. The method also includes receiving a second control channel or control region in the second subframe transmitted between the user equipment and the network equipment using a second type of radio access technology wherein the second control channel or control region in the subframe has a second frequency span which is configured according to the grant in the first transmission bandwidth configuration.

In an embodiment, an indicator in the control region of the first frequency span that uses the first radio access technology is used to adjust the parameters including the transmission bandwidth of the second transmission bandwidth configuration that uses the second radio access technology. In another embodiment, an indicator in the control channel or control region of the first frequency span that uses the first radio access technology is used to adjust the parameters including the selection of the second transmission bandwidth configuration of the second radio access technology. In another embodiment, receiving a second control channel in the first subframe using the first type of radio access technology wherein the second control channel includes a second scheduling grant for scheduling resources in the first subframe using the first type of radio access technology. In an embodiment receiving a third control channel in the second subframe where the third control channel is configured according to the scheduling grant.

Yet another method is disclosed. In this method, a message is received, wherein the message indicates a control region bandwidth pattern for a sequence of subframes. Then control signaling is received in the sequence of sub frames based on the received signaling, wherein the control region bandwidths of at least two subframes are different.

In FIG. 1, a multi-carrier wireless communication system 100 comprises one or more fixed network equipment such as base infrastructure units forming a network distributed over a geographical region for serving user equipment in the time and/or frequency span. A network equipment 110 may also be referred to as an access point, access terminal, base, base station, Node-B, eNode-B, a relay node, infrastructure node, or by other terminology used in the art. The one or more base units each comprise one or more receivers for receiving uplink transmissions 112 from user equipment 102 and one or more transmitters for transmitting downlink transmissions 114 to the user equipment 102. The transmitter and receiver discussed can also be known collectively as a transceiver. The base units are generally part of a radio access network that operates according to one of the known and standardized radio access technologies. The network includes one or more controllers 120 communicably coupled to one or more corresponding base units. The radio access network is generally communicably coupled to one or more core networks 130, 140, which may be coupled to other networks 130, like the Internet and public switched telephone networks, among other networks. These and other elements of access and core networks are not illustrated but they are well known generally by those having ordinary skill in the art. The controller 120 and other network nodes (not shown) provide the necessary components for the system 100 to operate and perform according to controlling standards and requirements.

In FIG. 1, the one or more base units 110 serve a number of user equipment or remote units 102 within a corresponding serving area, for example, a cell or a cell sector via a wireless communication link. The user equipment may be fixed units or mobile terminals. The user equipment or remote units may also be referred to as subscriber units, mobiles, mobile stations, users, terminals, subscriber stations, user terminals, relays, or by other terminology used in the art. The user equipment also comprises one or more transmitters and one or more receivers. In FIG. 1, the network equipment 110 transmits downlink communication signals to serve remote unit 102 in the time and/or frequency and/or spatial and/or code domain on the downlink channel 114. The remote unit 102 communicates directly with base unit 110 via uplink communication signals on the uplink channel 112. In some cases the remote unit may communicate with the base unit indirectly through an intermediate relay node.

In one implementation, the wireless communication system is compliant with the 3G High-Speed Packet Access (HSPA) protocols that include High-Speed Downlink Packet Access (HSDPA), 3GPP Universal Mobile Telecommunications System (UMTS) and Wideband Code Division Multiple Access (WCDMA), which are typically based on code division multiple access technology. Alternatively, the wireless communication may be compliant with the LTE protocol, also referred to as EUTRA or Release-8 (Rel-8) 3GPP LTE, Release-10 LTE or some later generation thereof, wherein the base unit transmits using an orthogonal frequency division multiplexing (OFDM) modulation scheme on the downlink channel and the user terminals transmit on the uplink channel using a single carrier frequency division multiple access (SC-FDMA) scheme, or a discrete Fourier Transform spread OFDM (DFT-SOFDM). More generally, however, the wireless communication system may implement some other open or proprietary communication protocol, for example, WiMAX based on IEEE802.16e or IEEE802.16m standards, among other protocols. The disclosure is not intended to be limited to the implementation of any particular wireless communication system architecture or protocol.

Figure 2:
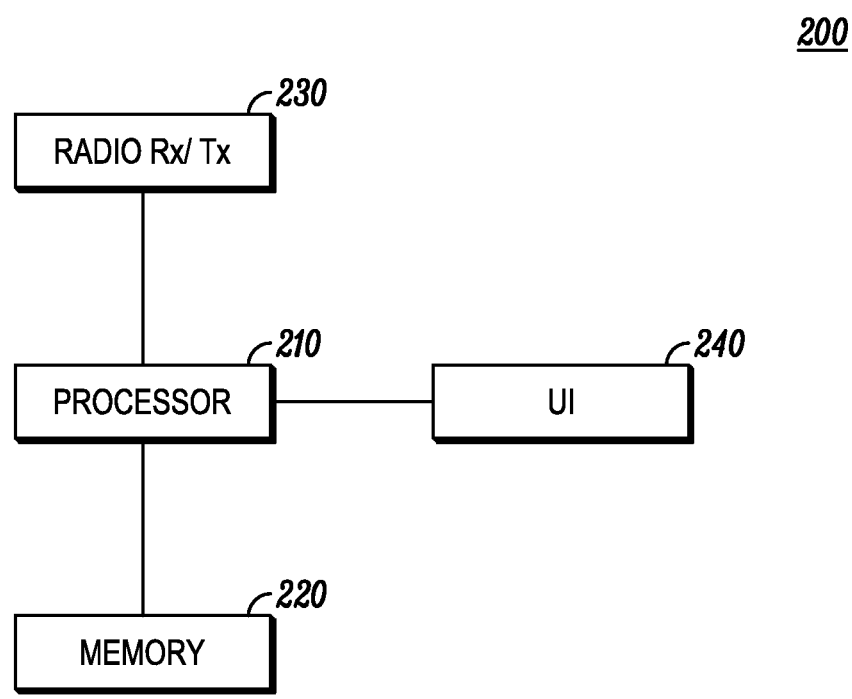
FIG. 2 illustrates a schematic block diagram of a user terminal used in accordance with some embodiments of the invention.

In FIG. 2, a UE 200 comprises a controller/processor 210 communicably coupled to memory 220, a transceiver 230 and user interface (UI) 240 via a system bus (not shown). Similar components are used as a part of network equipment 110. The UE is compliant with the protocol of the wireless communication system within which it operates, for example, the 3GPP LTE Rel-8, Rel-10, or later generation protocol discussed above. In FIG. 2, the controller/processor 210 may be implemented as any programmed processor. However, the functionality described herein may also be implemented on a general-purpose or a special purpose computer, a programmed microprocessor or microcontroller, peripheral integrated circuit elements, an application-specific integrated circuit (ASIC) or other integrated circuits, hardware/electronic logic circuits, such as a discrete element circuit, a programmable logic device, such as a programmable logic array, field programmable gate-array, or the like. The UE may also support other radio technologies, such as Wireless Local Area Network (or WLAN or WiFi), Bluetooth, etc.

In FIG. 2, the memory 220 may include volatile and non-volatile data storage, including one or more electrical, magnetic or optical memories such as a random access memory (RAM), cache, hard drive, read-only memory (ROM), firmware, or other memory device. The memory may have a cache to speed access to specific data. Data may be stored in the memory or in a separate database. The memory may be embedded with an ASIC that may include the baseband processor. Such memory is sometimes referred to as on-chip memory. Alternatively, the memory may be shared with other processors in the device such as an application or graphics processor, in which case the memory may be referred to as off-chip memory. The transceiver 230 is capable of communicating by transmitting and receiving data with user terminals and base stations pursuant to the wireless communication protocol implemented. The UI 240 connects to one or more input devices that may include a keyboard, mouse, pen-operated touch screen or monitor, voice-recognition device, or any other device that accepts input. The UI may also connect to one or more output devices, such as a monitor, printer, disk drive, speakers, or any other device provided to output data. As can be appreciated, the network equipment 110 is comparably equipped with the controller/processor 210 communicably coupled to memory 220 and a transceiver 230 to operate in conjunction with the user equipment 102, 200 in a known manner according to HSPA, LTE, etc.

According to LTE Release 8, downlink communications from a base unit, e.g., a Node B or enhanced Node B (eNB), such as network equipment 110, to a wireless communication device (user equipment or "UE"), such as remote unit 102, utilize orthogonal frequency division multiplexing (OFDM). In using OFDM, orthogonal subcarriers are modulated with a digital stream, which may include data, control information, or other information, to form a set of OFDM symbols. The orthogonal subcarriers may be contiguous or non-contiguous frequency bands, and the downlink data modulation may be performed using quadrature phase shift-keying (QPSK), 16-ary quadrature amplitude modulation (16QAM), or 64QAM.

Fourteen OFDM symbols are configured into a one millisecond (1 ms) downlink subframe for transmission from the base unit in the normal Cyclic Prefix (CP) case (and twelve OFDM symbols for the extended CP case). Within a subframe, data from a serving base unit is transmitted to its UEs on a Physical Downlink Shared CHannel (PDSCH) and control information is signaled on a Physical Downlink Control CHannel (PDCCH). In TDD, the sub frames on a carrier may be configured as downlink subframes, uplink subframes or a special subframe, which may contain a downlink portion, an uplink portion and a guard period between the uplink and downlink portions.

Control information in the PDCCH is transmitted using scheduling messages of different predefined downlink control information (DCI) formats. These scheduling messages inform a UE of the downlink control information (e.g., modulation and coding scheme, transport block size and location, pre-coding information, hybrid-ARQ (HARQ) information, UE identifier, etc.) that is required to decode the downlink data transmissions in the PDSCH or to transmit the uplink data on the Physical Uplink Shared CHannel (PUSCH). This control information is protected by channel coding (typically, a cyclic-redundancy check (CRC) code for error detection and convolutional encoding for error correction), and the resulting encoded bits are mapped on the time-frequency resources of the downlink sub frame.

The smallest time-frequency resource unit for transmissions is denoted a resource element (RE), which is one OFDM symbol (smallest time unit) by one subcarrier (smallest frequency unit). A group of four REs (or four REs plus two reference signal REs) is called a resource element group (REG). In one implementation, 9 REGs can make a Control Channel Element (CCE). The encoded PDCCH bits are typically mapped onto 1, 2, 4, or 8 CCEs, which are referred to as aggregation levels 1, 2, 4, and 8.

The UE searches different hypotheses (i.e., hypotheses on the aggregation level, DCI Format size, etc.) by attempting to decode downlink transmissions using a finite number of allowable configurations. This process is referred to as "blind decoding". For example, a UE performs blind decoding using the starting CCE locations allowed for that particular UE. This UE-specific search space is typically configured during initial set-up of a radio link and can be modified using a Radio Resource Control (RRC) message. Similarly, a common search space is also defined that is valid for all UEs being served by the same eNB and might be used to schedule broadcast downlink information like Paging, Random Access Response, or others.

A particular UE must locate the CCEs corresponding to each PDCCH candidate it is to monitor (i.e., blindly decode for each subframe control region). The CRC of each PDCCH is typically masked (e.g., using an exclusive-OR operation) by an identifier corresponding to the user equipment that the base unit is trying to schedule. The identifier is assigned to the UE by its serving base unit. This identifier is known as a radio network temporary identifier (RNTI). There are several types of RNTIs in LTE, such as cell RNTIs (C-RNTIs), semi-persistent scheduling RNTIs (SPS-RNTIs), and temporary cell RNTIs (TC-RNTIs). When a UE decodes a PDCCH, it must apply the appropriate RNTI in the form of a mask to the PDCCH CRC for successful PDCCH decoding to occur. When a UE successfully decodes a PDCCH of a particular DCI Format type, it uses the control information from the decoded PDCCH to determine, for example, the resource allocation, hybrid-ARQ information, and power control information for the corresponding scheduled downlink data transmission. In downlink HSPA, the UE identifier is called H-RNTI.

In addition to PDCCH signaling, a control region of a downlink subframe also includes a Physical Hybrid-ARQ Indicator CHannel (PHICH) that is used to transmit hybrid-ARQ acknowledgements, reference signals, and a Physical Control Format Indicator CHannel (PCFICH). In the context of LTE Release 8, each eNB-to-UE downlink has 1, 2, or 3 OFDM symbols at the beginning of each subframe for control signals. The number of OFDM symbols in this control region may vary each subframe and is signaled via the PCFICH in that same subframe. In some cases, the value of PCFICH may be signaled via higher layer signaling or may be fixed.

All the remaining OFDM symbols in the subframe are typically considered the data region of the subframe, and these symbols create the PDSCH. PDSCH transmissions can be mapped into one or more resource blocks (RBs). Typically, an RB is a set of subcarriers and a set of OFDM symbols. For example, an RB may contain 12 subcarriers (with a subcarrier separation of 15 kHz) and 7 OFDM symbols, with some resource elements being assigned to carry pilot signals, etc. PDSCH allocations for a UE are typically scheduled in pairs of RBs, with each RB pair spanning a single subframe and indexed using a single RB identifier.

A wireless communication device in the multi-carrier network generally supports multiple carriers comprising at least two component carriers, wherein each component carrier is associated with a configured bandwidth. For example, a first component carrier may be associated with a first transmission bandwidth configuration and a second component carrier may be associated with a second transmission bandwidth configuration. The component carrier may be a downlink component carrier or an uplink component carrier in the case of FDD or support both downlink and uplink communications in the case of TDD. The downlink component carrier and uplink component carrier may have the same or different transmission bandwidth.

In one embodiment, the first transmission bandwidth configuration of the first component carrier is not equal to the second transmission bandwidth configuration of the second component carrier. For instance, the first transmission bandwidth configuration may be 75 RBs, while the second transmission bandwidth configuration may be 25 RBs, leading to an aggregate transmission bandwidth configuration of 100 RBs.

In another embodiment, the first transmission bandwidth configuration of the first component carrier is equal to the second transmission bandwidth configuration of the second component carrier. For instance, the first and second transmission bandwidth configuration each have 50 RBs each, leading to an aggregate transmission bandwidth configuration of 100 RBs. In another embodiment, the first system bandwidth of the first component carrier is not equal to the second system bandwidth of the second component carrier. For instance, the first system bandwidth may be 15 MHz, while the second system bandwidth may be 5 MHz, leading to an aggregate system bandwidth of 20 MHz. In another embodiment, the first system bandwidth of the first component carrier is equal to the second system bandwidth of the second component carrier. For instance, the first and second system bandwidths are 10 MHz each, leading to an aggregate system bandwidth of 20 MHz.

Figure 3:
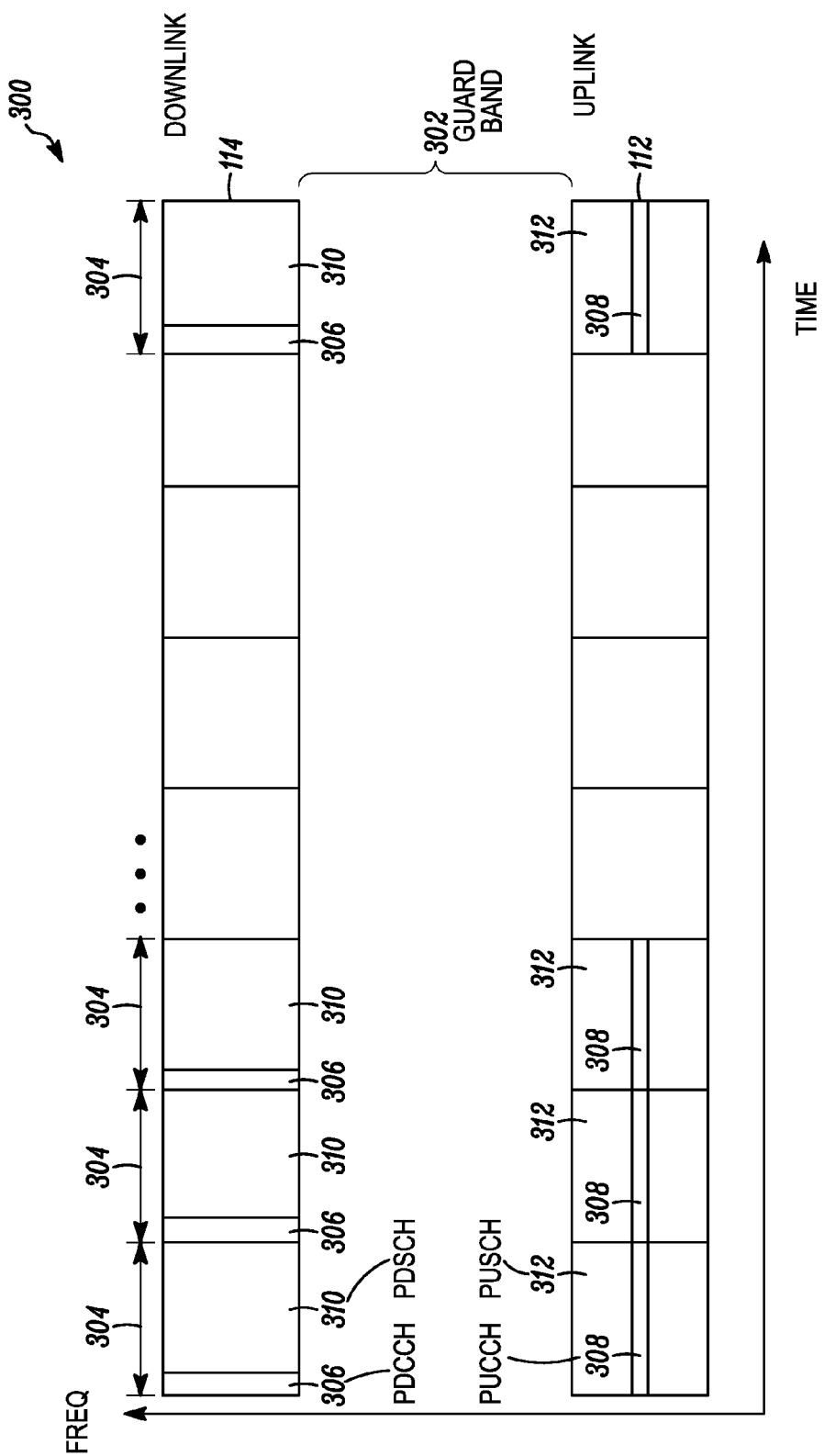
FIG. 3 illustrates a block diagram of frequency division duplex communications as is known in the prior art.

FIG. 3 illustrates a prior art embodiment 300 of uplink channel 112 and downlink channel 114 used for transmissions of signals between user equipment 102 and network equipment, such as base stations or eNode Bs 110. As understood by one of skill in the art, uplink channel 112 and downlink channel 114 are paired in a band such as 3GPP Band 17 that uses FCC Lower 700 MHz blocks B and C, which are known at least in HSPA and LTE. In an embodiment, the uplink and downlink channels 112, 114 have 5 MHz or 10 MHz system bandwidth for the transmission bandwidth configuration of that channel. The uplink channel 112 and downlink channel 114 are separated in the frequency span, represented in the vertical direction or y-axis. The separation in the frequency span can be known as a guard band 302. In the prior art, the guard band 302 allocated was large enough to prevent interference between the uplink and downlink channels 112 and 114 in the same subframe.

In addition to the frequency domain, the uplink and downlink channels transmit signals in the time domain. Signals in the time domain are transmitted between the user equipment 102 and the network equipment 110 in a time blocks known as subframes 304. Subframes in each frequency span are divided into different regions including physical downlink control channels (PDCCH) 306, physical uplink control channels (PUCCH) 308, physical downlink shared channels (PDSCH) 310 and physical uplink shared channels (PUSCH) 312. The PDCCH 306, PUCCH 308, PDSCH 310 and PUSCH 312 extend into the frequency domain to permit Frequency Division Duplex (FDD) communication. It is also understood that the same channels PDCCH, PUCCH, PDSCH, PUSCH, may be used for Time Division Duplex (TDD) communication. Note that there may be several other channels or signals apart from the PDCCH, PUCCH, PDSCH, and PUSCH that are part of the protocol, but these are not discussed in detail in the specification. It is known to one skilled in the art that such other channels (PCFICH, PHICH, etc) and signals could be present within the uplink or downlink signals.

Figure 4A:
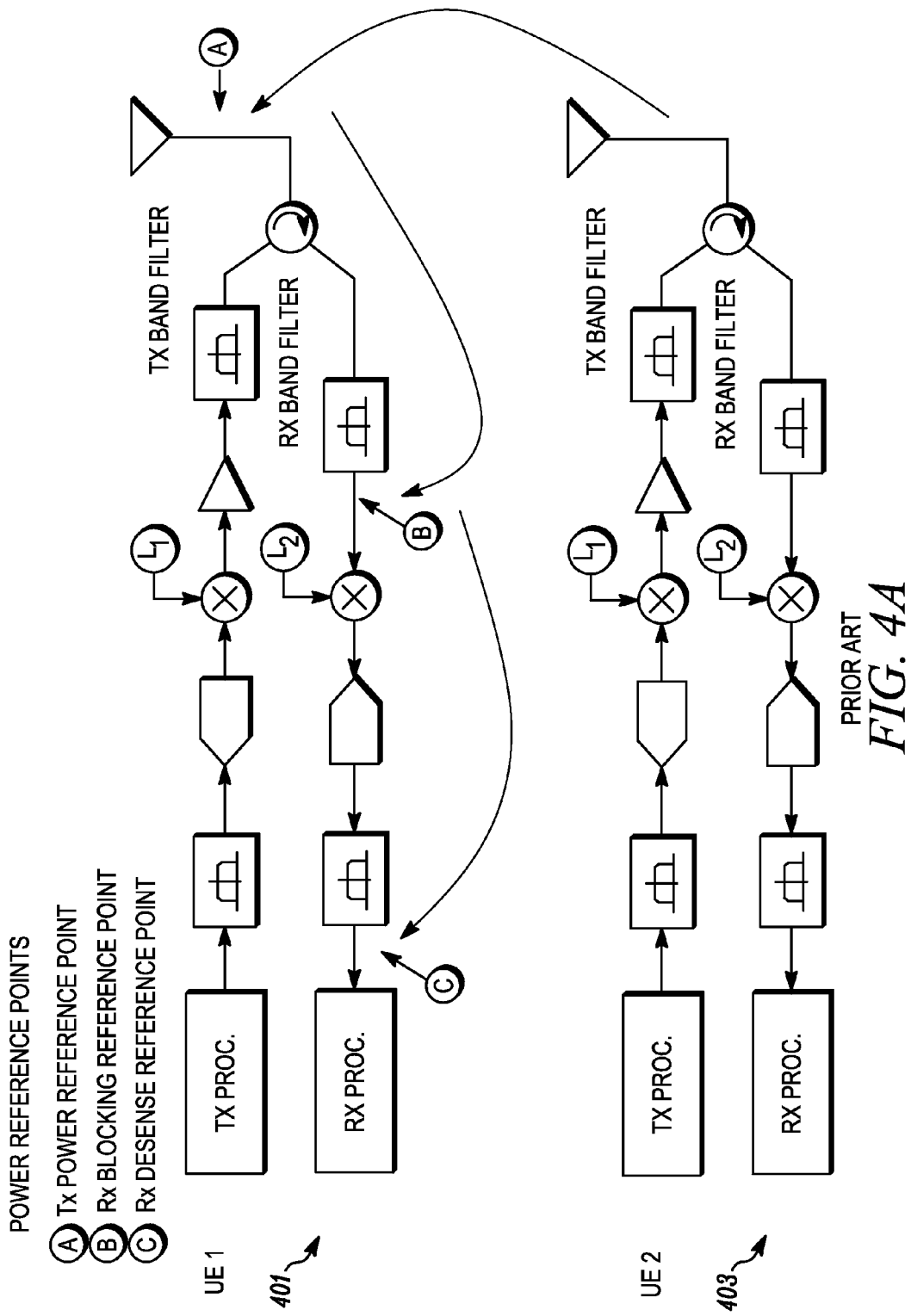
FIG. 4*a* illustrates a block diagram of a transceiver where desensing can arise.

FIG. 4a is a block diagram of user equipment 401, 403 where interference and desensing can occur. The user equipments 401, 403 provide the key mechanisms that have an impact on the RF performance due to a change in scalable bandwidth. As shown, the transceiver blocks exhibit spurious performance that contributes to the interference. The receive interference can be due to the co-location of transmitters (e.g., multiple radio access technologies operating simultaneously within a UE, or multiple UEs that come very close to each other) or from multiple channels. Thus, spurious emissions fall in the co-located closest receive frequencies. Alternatively, receiver desensing in a UE (or eNB) can occur due to self-interference (i.e., due to action (e.g., transmission of another signal) by some other component within the UE (or eNB)). Thus, transmit spurious emissions occur on the duplex receive channel and create self-desense from the associated transmitter operating on the same platform.

Figure 4B:
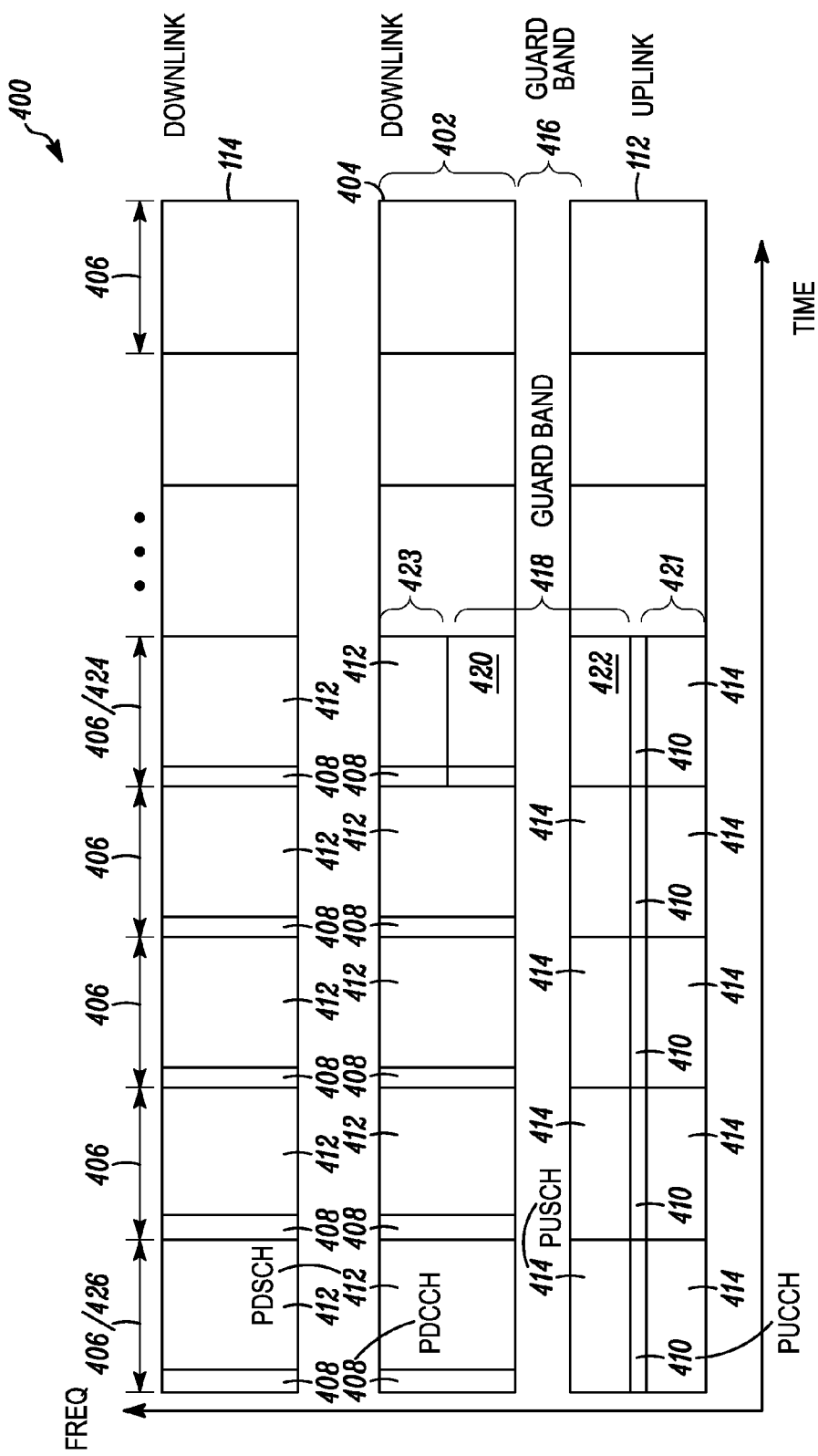
FIG. 4*b* illustrates a block diagram of frequency division duplex communications used in accordance with some embodiments of the invention and were desensing can arise.

FIG. 4b illustrates an embodiment where an additional carrier with a transmission bandwidth configuration, Band Z, 402 is provided. Additional frequency span implies additional spectrum is available for wireless communication that is useful for serving more users, providing greater data rates to existing users, or in general for providing enhanced service within the coverage area. The transmission bandwidth configuration 402 can be allocated between the frequency spans used for uplink and downlink channels 112, 114 from FIG. 3 as seen in FIG. 4b. As such, transmission bandwidth configuration 402 is proximate or nearest to uplink channel 112. Transmission bandwidth configuration 402 can also be proximate or nearest to downlink channel 114. As such, the transmission bandwidth configuration 402 is allocated within the former guard band 302 or the separation region between the downlink and uplink channels such that transmission bandwidth configuration 402 can cause interference with uplink and downlink channels 112, 114. Uplink channel 112 and downlink channel 114 can also cause interference into transmission bandwidth configuration 402. In an embodiment, the transmission bandwidth configuration 402 can be used as a downlink channel 404 and it is possible that the downlink channel 404 is aggregated with one or both of downlink channel 114 and uplink channel 112.

Similar to FIG. 3, signals in the time domain are transmitted and received between the user equipment 102 and the network equipment 110 in a subframe 406 in the different frequency spans of transmission bandwidth configurations. For a subframe 406, the transmission bandwidth configurations for subframes 406 are divided up into PDCCH 408, PUCCH 410, PDSCH 412 and PUSCH 414. The PDCCH 408, PUCCH 410, PDSCH 412 and PUSCH 414 extend into the transmission bandwidth configuration to permit Frequency Division Duplex (FDD) communication. The same channels may also be used to permit TDD communication. As is understood, the PDCCH and PUCCH are provided with a given number of subcarriers such that the PDCCH and PUCCH function as control regions for the subframe 406. The control regions can provide control information for communications between the user equipment and the network equipment. In addition, other types of channels (not shown) can be provided.

The insertion of transmission bandwidth configuration 402 into the guard band 302 or the separation region decreases the available frequency spectrum so that reduced guard band 416 exists between uplink channel 112 and downlink channel 404. In addition, the reduced guard band 416 increases the likelihood of interference between the uplink channel 112 and downlink channel 404 for particular user equipment 102. In this situation, the interference caused by the channels 112 and 404 is self interference. Interference may also occur between various user equipment and various network equipment including base-station-to-base-station interference. For example, one user equipment may be receiving data on frequency span 402 while a nearby or collocated user equipment is transmitting on transmission bandwidth configuration of uplink channel 112. When transmissions between the user equipment 102 and the network equipment (e.g., eNode B 110) are scheduled in simultaneous or at least overlapping time periods, desensing of the transmission on both the uplink and downlink can occur. The desensing occurs from the interference and the reduced guard band 416.

Interference can be caused by subcarriers in the downlink channel 404 being proximate to subcarriers in the uplink channel 112 because the bandwidth that separates the two channels has been decreased due to a reduced bandwidth 416 of separation. Interference can also be caused on the uplink channel 112 by the subcarriers in the downlink channel 404 that are not proximal and are distal to the uplink channel 112. Thus, the configuration of downlink channel 404 and the allocation of resources in the downlink channel can cause interference and desensing in uplink channel 112. A determination can be made that examines the subcarriers in the uplink channel 112 and the downlink channel 404 to figure out the origins of the interference and desensing between the channels.

Allocation of resources, consisting of resource elements or subcarriers in the uplink and downlink channels, can be varied according to the understanding of which subcarriers (or resource elements) are causing the interference. These factors are considerations into the allocation of bandwidth in the channels that form the effective guard band 418. In an embodiment, it is understood that the allocation of resources, consisting of resource elements or subcarriers, that are at the edges of the uplink channel 112 and downlink channels 404 such that they are proximate to one another can cause interference between the channels in the situation where there is the reduced guard band 416.

FIG. 4b illustrates an embodiment that reduces the desensing that occurs between the uplink channel 112 and downlink channel 404. As shown, an effective guard band 418 is created by adjusting the transmission bandwidth of one or both of the downlink channel 404 and the uplink channel 112. As will be understood from the detail provided below, the adjusted transmission bandwidth of an uplink or downlink channel can be considered a portion of allocable resource elements within the transmission bandwidth configuration of the channels.

In an embodiment, the 10 MHz channel bandwidth provided for downlink channel 404 and uplink channel 112 can be reduced to, for example, 5 MHz where the effective 5 MHz bands may be provided on the edges of the channel such that the effective guard band 418 is as large as possible. More generally, the portion of the transmission bandwidth configuration that is used to allocate subcarriers for uplink transmission within the frequency span 112 is modified to reduce interference to transmission bandwidth configuration 402. It is understood by those of skill in the art that reduction or modification of the transmission bandwidth that is available to allocate subcarriers used within one or both of the downlink channel 404 and the uplink channel 112 can vary depending on needs and measured desensing and the level of interference between the channels. Nonetheless, the transmission bandwidth used to allocate subcarriers of the channels should be maintained at a value where effective transmissions can occur in the channels. The effective guard band 418 includes bandwidth from different sources in order to reduce the desensing between channel 404 and channel 112. As seen, effective guard band 418 includes the reduced bandwidth 416 as well as a bandwidth 420 from the downlink channel 404 as well as bandwidth 422 from uplink channel 112.

The transmission bandwidth of uplink channel 112 can be determined by an indicator that is provided in a control region of a downlink channel. In an embodiment, the indicator can be a part of an uplink scheduling grant, a downlink scheduling grant or a bit map. In the case of the bit map, the bandwidth of a frequency span can be delivered directly to a UE using dedicated radio resource control (RRC) signaling (i.e., dedicated signaling channel) or to many UEs using cell-specific RRC signaling (broadcast control) that is a part of a system information block (SIB) or a master information block (MIB). The use of uplink and downlink scheduling grants is a rapid and dynamic way of setting the transmission bandwidth within the transmission bandwidth configuration of the uplink and downlink channels, respectively, because the scheduling grants containing the indicator can be sent on a subframe-by-subframe basis, as compared to higher layer signaling, (e.g., RRC) that typically results in slower variation (e.g., tens or hundreds of subframes) given the relatively infrequent nature of that type of signaling. The use of RRC scheduling reflects a lower-speed, occasionally adjusted, or a semi-static method of setting the transmission bandwidth for one or more user equipments for a given frequency span. Scheduling is semi-static as the bandwidth settings are kept constant unless otherwise changed according to the RRC scheduling parameters.

The indicator is received by the user equipment 102 in a PDCCH 408. In an embodiment, the uplink scheduling grant for scheduling an uplink transmission in a given subframe n 424 is received in a prior subframe, such as subframe n−4 426. It is understood that the timing relationships of the subframe 424 and the previous subframe 426 may be different and variable in TDD systems. In TDD systems, the uplink scheduling grant is received in subframe n-k where the value of k is dependent on the TDD Uplink/Downlink configuration and the actual value of n.

The PDCCH 408 in the previous subframe uses a first transmission bandwidth configuration that in general occupies a preferred portion of the channel for the purpose of minimizing interference to an adjacent channel with a transmission bandwidth configuration used for uplink transmissions. The transmission bandwidth configuration used by the PDCCH 408 can range in extent from a minimum (e.g., 6 RBs in case of LTE) to a maximum (e.g., 100 RBs in case of LTE). The transmission bandwidth configuration of the uplink channel 112 can also range from a minimum (e.g., 6 RBs in case of LTE) to a maximum (e.g., 100 RBs in case of LTE), In the example when simultaneous transmissions on the uplink channel 112 and the downlink channel 404 will cause desensing, the transmission bandwidth that is used to allocate subcarriers in at least one of the uplink channel and the downlink channel will be reduced to create the effective guard band 418. The bandwidth used to create the effective guard band 418 is determined from the control region of the subframe based on that received uplink scheduling grant in the previous subframe n−4 426 for the uplink channel 112 and the allocation of a frequency span for the downlink channel 404 in a downlink scheduling grant. The uplink channel 112 and the downlink channel 404 using the reduced transmission bandwidth create the effective guard band 418 that occurs simultaneously or overlaps in time.

FIG. 4b illustrates that the transmission bandwidth configuration of subframe 424 on the downlink is smaller (has a reduced or partial bandwidth) than the transmission bandwidth configuration that can be selected in the downlink channel 404. The subframe 426 on the downlink includes a control region 428. At least one of the subcarriers in control region 428 includes a scheduling grant with the indicator where the scheduling grant can be one of an uplink scheduling grant or a downlink scheduling grant. The control region 428 can include both an uplink scheduling grant, a downlink scheduling grant or a bit map that is used to indicate the transmission bandwidth configuration of the subsequent subframe that can be used to allocate subcarriers. In an embodiment, the uplink scheduling grant in control region 428 from subframe n−4 426 corresponds to scheduling the transmission bandwidth configuration of the uplink channel in subsequent subframe n 424.

The user equipment 102 determines transmission bandwidth configuration for subframe 424 from the scheduling grant, which can include the indicator, received in subframe 426. In an embodiment, the user equipment 102 determines the transmission bandwidth configuration for subframe 424 by decoding of the uplink or downlink scheduling grant.

As stated, the indicator can be included in an uplink scheduling grant. Moreover, the indicator in subframe 426 modifies the characteristics of the uplink channel 112 (i.e., the indicator modifies the transmission bandwidth characteristics of the uplink channel). The uplink scheduling grant of subframe n−4 426 can contain data that determines the transmission bandwidth of the uplink channel 112 used to allocate resource elements in subframe n 424. In an embodiment, the transmission bandwidth 421 of subframe 424 on the uplink channel 112 can be reduced so that subframe 424 includes a bandwidth 422 that increases the guard band 416 to effective guard band 418. In an embodiment, the downlink scheduling grant in subframe 426 can include an indicator to determine the transmission bandwidth 423 of the downlink channel 404 of subframe 424 used to allocate resource elements. The transmission bandwidth 423 of subframe 424 on the downlink channel can be reduced so that subframe 424 includes a bandwidth 420 that increases the guard band 416 to effective guard band 418.

The allocable bandwidth of the downlink channel in a subframe that is allotted to allocate subcarriers may be referred to as a downlink transmission bandwidth configuration in the subframe. The downlink transmission bandwidth configuration may be the control region bandwidth of the subframe (i.e., the bandwidth over which the UE is configured or scheduled to receive control information). The downlink system bandwidth (or downlink channel bandwidth) may also refer to the maximum number of allocable resource blocks in the subframe from the UE's perspective.

For instance, if the downlink system bandwidth is 5 MHz, the total maximum number of allocable resource blocks in a subframe (i.e., the frequency extent of the transmission bandwidth configuration which is given in RBs for LTE) may be only 25 (since only 90% of the 5 MHz system bandwidth (i.e., 4.5 MHz) is allocable as RBs with the rest used for guard band otherwise there could be 27 RBs in 5 MHz corresponding to a 97.2% allocable bandwidth), whereas the total maximum number of allocable resource blocks in a subframe with 10 MHz downlink system bandwidth is 50 for 90% allocable bandwidth and 55 for 99% allocable bandwidth. Given the allocable bandwidth percentage of the channel bandwidth (system bandwidth) is fixed and known a priori along with the possible channel bandwidths then the system bandwidth or transmission bandwidth configuration may be directly or indirectly inferred from the dimension of the resource allocation field with the detected control information. Either the downlink system bandwidth (after accounting for specified guard bands given occupancy) or the downlink transmission bandwidth configuration (no explicit guard bands) may also be used to refer to the bandwidth over which the UE may expect the transmissions of certain signals from the network within the subframe. For instance, the UE may expect the cell-specific reference signals such as Channel State Information-Reference Signals (CSI-RS), or cell-specific reference signal (CRS) from the base station.

Thus, the system bandwidth (after accounting for specified guard bands) or transmission bandwidth configuration could also be interpreted as a UE-specific bandwidth over which the UE expects signals according to a standard from the network and this bandwidth may be variable on a dynamic basis. Alternately, the system bandwidth (after accounting for guard bands) or transmission bandwidth configuration may also refer to the bandwidth over which the UE is expected to perform measurements such as CSI measurements, Radio Resource Management (RRM) measurements such as RSRP, RSRQ, RSSI, RLM, etc. As can be appreciated, similar principles can be used for an uplink system bandwidth or uplink transmission bandwidth configuration in the subframe.

The use of an indicator as a part of uplink scheduling grants, downlink scheduling grants and bit maps allocate the transmission bandwidth configuration of uplink and downlink channels used for allocating subcarriers. Accordingly, the bandwidth 421 of the uplink channel 112 and the bandwidth 423 of the downlink channel 404 create bandwidths 420 and 422 that provide for effective guard band 418. In other words, bandwidths 420 and 422 are partial frequency spans from the uplink channel 112 and downlink channel 404 such that the transmission bandwidth configurations 421, 423 for the uplink channel and downlink channel 112, 404, respectively, in subframe 424 are smaller or have reduced bandwidths. Thus, the bandwidth of a frequency span in a subsequent subframe n can be less than frequency span for the subframe n−4.

Figure 5:
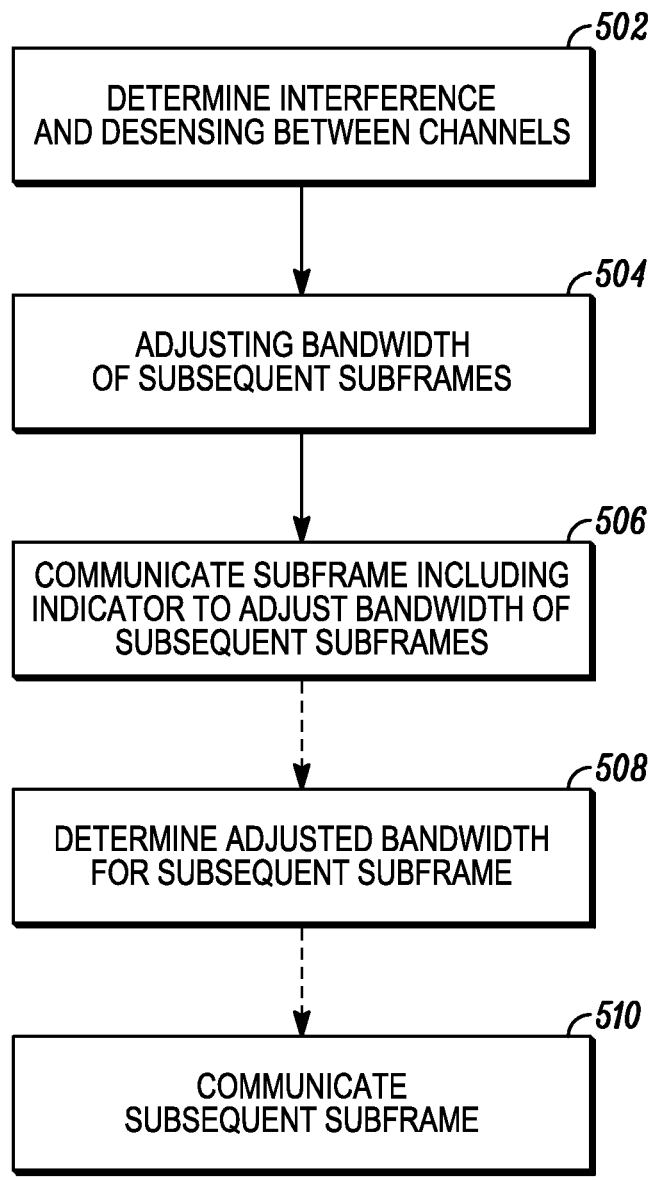
FIG. 5 is a flow diagram of scheduling subframes to reduce desensing in the transmission bandwidth configurations used in accordance with some embodiments of the invention.

FIG. 5 illustrates a flow diagram 500 that describes the creation of the effective guard band 418 for subframe 424. The method described in FIG. 5 begins by determining 502 during the configuration of the control region of subframe n−4 426 that there is a likelihood or that there will be interference between the uplink and downlink channels 112, 404 that will cause desensing in a subsequent subframe 424. Interference can be determined by the base station 110, controller 120 or by an associated scheduling or control entity that is located in the network. User equipment 102 can also be used to determine interference.

In response to the determination that interference will occur in the subsequent frame, the network equipment can adjust 504 the transmission bandwidth configurations that is used to determine the allocation of subcarriers for one or both of the uplink channels and downlink channels in subframe 424. As is understood, setting the transmission bandwidth configuration is equivalent to designating which of the subcarriers, resource blocks, resource element blocks, subchannels, resource element groups, and other allocable resources in the channel are available to be scheduled or allocated in the channels 112, 404. Different regions in the control region 408, 410 and data region 412, 414 of a channel can be muted or avoided so that the transmission bandwidth configuration can be set to, therefore, reduce interference and desensing. Resource element groups can be muted by reducing the power for those groups, by not allocating data to those resource element groups, or other known methods.

These transmission bandwidth configurations can be communicated based on the uplink and downlink scheduling grants in subframe 426. The indicated transmission bandwidth configuration can be different from the transmission bandwidth configuration that is utilized in the uplink and downlink channels. As the transmission bandwidth configuration of the uplink channel or downlink channel used to allocated subcarriers is set differently, the bandwidth of the effective guard band 418 is also inversely set so that the smaller the frequency span's bandwidth in the uplink or downlink the larger the bandwidth for the effective guard band.

Accordingly, subframe 426 is used to set the transmission bandwidth configuration of subframe 424 in at least one of uplink channel 112 or downlink channel 404. The subframe 426 has a given transmission bandwidth configuration, which can be set in an appropriate standard. The transmission bandwidth configuration includes a plurality of resource blocks and where at least one of the resource blocks is configured as a control region 408. In an embodiment the transmission bandwidth configuration includes a plurality of resource block pairs were the first 1, 2, or 3 OFDM symbols of the first resource block of the resource block pair are configured as a control region 408. In addition, at least one of the other resource blocks is configured as data region 412.

The control region includes the indicator that can be used for scheduling the transmission bandwidth of a subsequent subframe's 424 transmission bandwidth configuration. The indicator can be a part of the uplink scheduling grant or a downlink scheduling grant. Subframe 426, which includes the indicator to adjust the transmission bandwidth, is communicated 506 between the network equipment 110 and the user equipment 102. Upon receipt of the indicator by the user equipment 102, the transmission bandwidth configuration 424, which may be modified or adjusted relative to the transmission bandwidth configuration used for subframe 426, of the subsequent subframe can be determined 508 to determine possible subcarrier allocations in those subframes. When the user equipment decodes a control channel in the control region, the indicator is decoded such that the user equipment is informed of the transmission bandwidth configuration, which determines possible subcarrier allocations, of the subsequent subframe 424. As the indicator can be in one or both of the uplink scheduling grant and downlink scheduling grant, the user equipment 102 decodes the transmission bandwidth configuration for both the uplink and downlink channels used for communication with the network equipment 110.

In an embodiment, the subsequent subframe 424 is communicated 510 from network equipment 110 to the user equipment 102. As the interference for subframe 424 was anticipated and planned for in previous subframe 426, the network equipment 110 uses the downlink transmission bandwidth configuration set for subframe 424 to transmit data on the downlink channel 404, and the user equipment 102 uses the downlink transmission bandwidth configuration set for subframe 424 to receive data on the downlink channel 404. Likewise, the user equipment 102 uses the uplink transmission bandwidth configuration for subframe 424 to transmit data on the uplink channel 112, and the network equipment 110 uses the uplink transmission bandwidth configuration set for subframe 424 to receive data on the uplink channel 112. As can be appreciated, the transmission bandwidth configuration can be set differently for both the control region 408 and the data region 412. It can also be set differently for the uplink data region 414 and the uplink control region 410.

Bandwidths 420 and 422 can be created by muting a set of resource element groups in the control region of the downlink channel 402 and muting one or more resource blocks in the control region of the uplink channel 112 such that subcarriers cannot be allocated in the muted set of resources element groups and resource blocks. The muted resource element groups can correspond to those regions of the transmission bandwidth configuration where desensing is determined to occur such that those regions are to be avoided during allocation. Resource element groups can be muted by adjusting the power to given resource element groups, restricting the allocation of the data to those given resource element groups and by other known methods. In addition, the set of resource element groups that are to be muted or are not allocated in the transmission bandwidth configuration are determined from the uplink resource allocation in the subframe n−4 426 for subframe n 424. When the control region of the subsequent subframe n 424 is received, a set of control channel elements can be determined that is based on at least the uplink resource allocation from the subframe n−4 and the control region of the channel can be detected using the received set of control channel elements.

In view of the foregoing, interference in the channels used by network equipment and user equipment is reduced for a given subframe by adjusting attributes of the channels in the subframe. These attributes, such as the transmission bandwidth configuration, can be based on receiving uplink and downlink scheduling grants as well as other corresponding resource allocation information that can be provided in a control region of a subframe. In addition, the adjusted attributes can affect the duplex spacing of the uplink and downlink transmission bandwidth configurations for a given subframe. It is possible to create smaller and larger control regions in frequency span of the transmission bandwidth configuration, such as uplink channel 112, by using the PDCCH of frequency span of another transmission bandwidth configuration or in cross carrier scheduling between downlink channels 114 and 404 and uplink channel 112. These varying control regions can be detected from the indicators in the control region or by blindly decoding the frequency spans by the user equipment as described below. In an embodiment, network equipment can vary the control region by adjusting the number of resource blocks or the number resource element groups (REGs) that are scheduled, assigned or configured for the control region and/or for a data region of a subframe for a subframe's different frequency spans. Scheduling of the resource blocks or REGs can be adjusted based on known desensing and interference patterns that exist between the uplink and downlink channels.

In the situation where the user equipment is scheduled in subframe n according to a grant in subframe n–4, the user equipment may modify or reduce its control channel search space in at least subframe n. This can be a result of the contemporaneous event of transmitting and receiving in the subframe n and could be done without using blind detection, as described below, or from receiving an explicit indication. Since the network equipment delivers the grant in subframe n–4, it also knows that the user equipment will use the reduced bandwidth for the control region so that the network equipment and the user equipment are synchronized. In the event that the user equipment misses the scheduled grant due to errors or CRC failure, the user equipment may simply fall back to a default receiving step using fixed, pre-determined or a configured hypothesis of the control channel search space.

Figure 6:
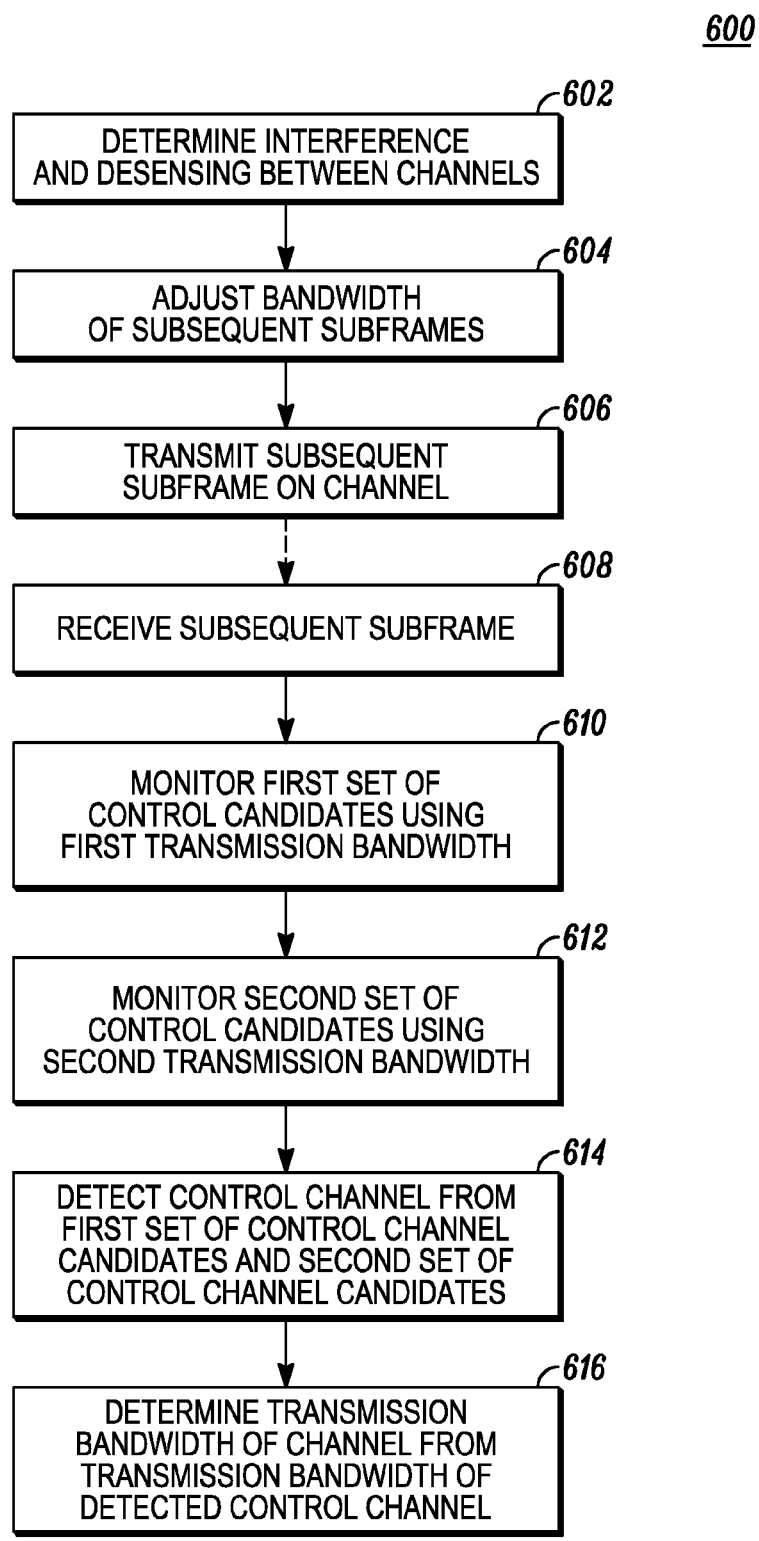
FIG. 6 is a flow diagram of blind decoding in the transmission bandwidth configurations used in accordance with some embodiments of the invention.

FIG. 6 illustrates a flow diagram 600 of a method of detecting and determining the allocated bandwidths of a subframe 424 or the use of an effective guard band 418 using the principles of blind decoding. In contrast to the method described in connection with FIG. 5 where the transmission bandwidth configuration that is available to allocate subcarriers is provided as a part of an uplink or downlink scheduling grant or a bit map, the method described using blind decoding determines the bandwidth of one of a uplink channel or a downlink channel by monitoring the subframe using different transmission bandwidth configurations that are received. Blind decoding as described can be performed regardless of the accurate decoding or actual use of the indicator in the control region of a subframe that allocates a bandwidth for a frequency span in a given subframe.

The method described in FIG. 6 begins by determining 602 that there will be interference between the uplink and downlink channels that will cause desensing in subframe 424. In response to determining the interference, the network equipment adjusts 604 the transmission bandwidth configuration in which resource elements are available to be allocated in one or both of the uplink channel and downlink channel for subframe 424. The determination that the transmission bandwidth configuration of the uplink or downlink channel needs to be adjusted (set differently) can occur at any subframe previous to subframe n 424 such as subframe n–4 426. In an embodiment, the subframe 424 has adjusted the transmission bandwidth configuration so that that bandwidth is reduced from the allotted frequency span of the subframe's 424 transmission bandwidth configuration. As is understood, adjustments for the subframe 424 can be determined for one or both of the uplink channel 112 and downlink channel 404. In an embodiment, the allotted bandwidth of the transmission bandwidth configuration can be 10 MHz that is reduced to a transmission bandwidth of 5 MHz in which subcarriers can be allocated.

After a determination by the network to adjust the transmissions bandwidth configuration of subframe 424 is made, the network equipment 110 transmits 606 subframe 424 having an adjusted control region 428 on the downlink channel 404 to the user equipment 102. The transmission in subframe 424 is received 608 by the user equipment 102. As understood by controlling standards, the transmitted bandwidth configuration of the received subframe 424 is expected to be the allotted bandwidth of the transmission bandwidth configuration (e.g., 10 MHz) of the standard uplink and downlink channels, but to avoid the desensing caused by downlink channel 404, the adjusted transmission bandwidth configuration of the received downlink channel subframe 424 is determined by monitoring the received transmission bandwidth configuration used.

As mentioned, the user equipment receives the subframe 424 on downlink channel 404. The user equipment monitors 610 a first set of control channel candidates using a first transmission bandwidth configuration of the subframe 424. In addition, the user equipment monitors 612 a second set of control channel candidates using a second transmission bandwidth configuration of the subframe 424. In an embodiment, monitoring the control channel candidates in the received transmission bandwidth configuration includes demodulating the control region 428 using a first transmission bandwidth configuration. In addition, the control channels of the received transmission bandwidth configuration are monitored by demodulating the received bandwidth using a second transmission bandwidth configuration. The first transmission bandwidth configuration can be allotted bandwidth of the channel as a pre-configured value set by a standard and the second transmission bandwidth configuration value can be the adjusted or have reduced bandwidth that network equipment uses to avoid desensing. Note the second bandwidth may also be from a set of configured bandwidths supported by the standard, which may or may not be explicitly signaled to the user equipment.

Returning to FIG. 6, the control channel 428 of the downlink channel is detected 614 from one of the first set of control channel candidates and the second set of control channel candidates. The control channel is detected in one of the first set or second set of control channel candidates. As explained, this can be achieved by demodulating the control channel candidates to detect to the control channel. The transmission bandwidth configuration that is being used to determine subcarrier allocations for subframe 424 is determined 616 from the transmission bandwidth configuration used for the detected control channel. In other words, the transmission bandwidth configuration used to determine subcarrier allocations in the transmission bandwidth configuration for the data channel 412 of the downlink channel 404 can correspond to the detected transmission bandwidth for the control channel 428 for the downlink control channel. In addition to detecting the transmission bandwidth configuration by monitoring the control channel candidates, the user equipment may receive a message that indicates the transmission bandwidth configuration. The message can be used in conjunction with detecting the control channel candidates to determine the transmission bandwidth configuration that is to be used to determine subcarrier allocations.

When there is no desensing between downlink channel 404 and uplink channel 112, the determined transmission bandwidth configurations for the channels corresponds to the allotted channel (or system) bandwidth of 10 MHz. When desensing is anticipated, however, the determined bandwidths used for the transmission bandwidth configuration for the channels can be the reduced to a channel bandwidth of 5 MHz (with the corresponding channel transmission bandwidth configuration of 25 RBs), or some other modified or reduced value for the bandwidth. These known channel bandwidth values of 10 MHz (50 RBs) and 5 MHz (25 RBs) or transmission bandwidth configuration of 50 RBs and 25 RBs can be used in monitoring the first set and second set of control channel candidates.

As is understood, the method described by FIG. 6 can be based on both the uplink and downlink channels. Accordingly, an embodiment includes that the monitored or demodulated control channel candidates from the first bandwidth and the monitored or demodulated control region from the second bandwidth are used to determine the transmission bandwidth. This can be performed, for example, by comparing the transmission bandwidth of the first and second control channel candidates to a plurality of different known bandwidths (i.e., which is a set of values configured via higher layer communications or a set of values specified in the standard). In the example being used, this comparing step can compare the bandwidth of the frequency span to a 10 MHz bandwidth and a 5 MHz bandwidth, for example.

In another embodiment, the transmission bandwidth configuration can be determined by examining the edges of the allocated subcarriers that make up the subframe. In the case where the bandwidth of the transmission bandwidth configuration extends for the entire allocable bandwidth (e.g., 9 MHz) of the channel bandwidth, (e.g. 10 MHz), data will be allocated across the frequency span. In the case where a transmission bandwidth configuration with a reduced bandwidth (e.g., 25 RBs) corresponding to a channel bandwidth of (e.g., 5 MHz), data will be allocated to less than the entire frequency span of the channel bandwidth and in bandwidth 421, 423. Thus, frequency spans 420, 422 will not have allocated data. This can be achieved by altering the size or interpretation of the resource allocation field within the control signaling information element that schedules data allocation. For instance, if the reduced frequency span (or bandwidth) of the transmission bandwidth configuration used to allocate subcarriers is 5 MHz, the total maximum number of allocable resource blocks in a subframe may be only 25, whereas the total maximum number of allocable resource blocks in a subframe with 10 MHz frequency span is 50.

In an embodiment, the transmission bandwidth configuration can be determined by examining how data is allocated to subcarriers of the subframe 424. Data is allocated across the bandwidth of the subframe according to a transmission bandwidth of the channel that is available to allocate subcarriers. As such, the bandwidth can be determined by determining the frequency of boundaries or edges of the allocated subcarriers in the subframe. If the edges extend for the allotted bandwidth of the transmission bandwidth configuration, the bandwidth is known to be 10 MHz. Otherwise, the bandwidth can be calculated using the transmission bandwidth of the subcarriers at the edges of the subframe. In another alternative embodiment, desensing can be avoided by allocating subcarriers according to known patterns. By demodulating a known pattern of subcarriers in a channel 112, 404, an adjusted transmission bandwidth can be determined. In view of the foregoing examples, a small bandwidth carrier can be configured within a larger bandwidth for a frequency span and can be blindly detected by the user equipment.

Figure 7:
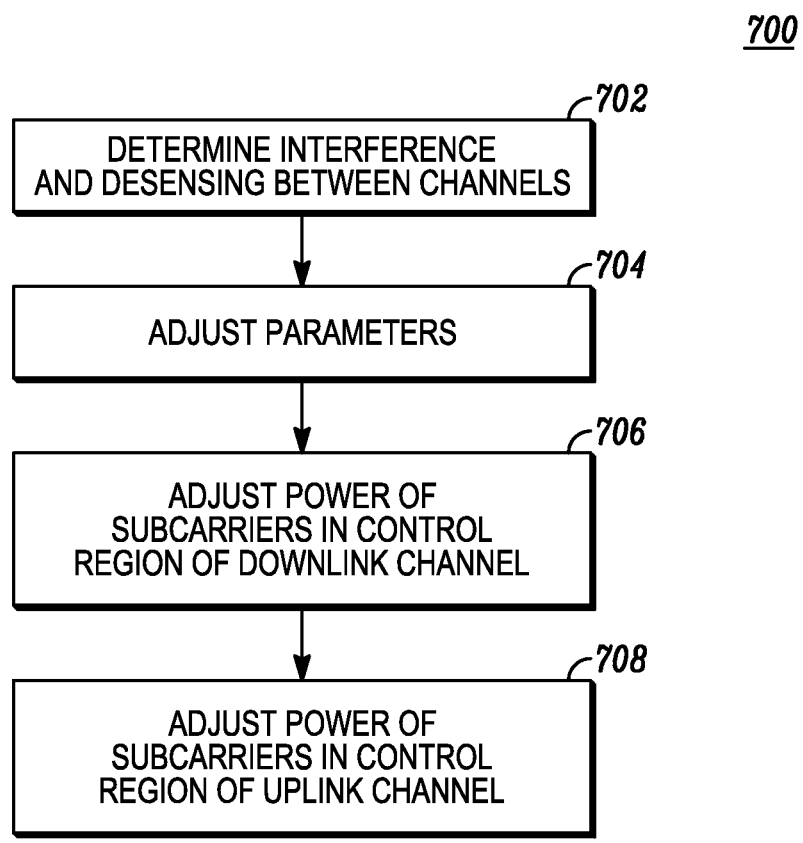
FIG. 7 is a flow diagram of scheduling subframes to reduce desensing in the transmission bandwidth configurations used in accordance with some embodiments of the invention.

FIG. 7 illustrates a flow diagram 700 of another method of detecting, determining and establishing an effective guard band 418. The method described in FIG. 7 begins by determining 702 that there will be interference between the uplink and downlink channels that will cause desensing in subframe 424. In response to determining the interference, the network equipment adjusts 704 the transmission bandwidth configuration of one or both of the uplink channel and downlink channel for subframe 424 in which the network equipment will allocate subcarriers to the user equipment and in which it will receive subcarriers on the uplink. The determination that the bandwidth of the uplink or downlink channel needs to be adjusted can occur at any subframe previous to subframe n 424 such as subframe n−4 426. In an embodiment, the subframe 424 has a reduced transmission bandwidth configuration (25 RBs) from the maximum allowed transmission bandwidth configuration of the subframe 424. In an embodiment, the allotted frequency span can be 10 MHz that is reduced to bandwidth of 5 MHz.

After making a determination by the network to adjust the transmission bandwidth configuration of subframe 424 is made, the network equipment 110 adjust 706 the power of at least one subcarrier of the control region 428 in downlink channel 404 of subframe 424. In order to reduce the desensing that may occur between channels 112 and 404, the network equipment reduces the power in a plurality of subcarriers that make up the transmission bandwidth configuration of downlink channel 404. In one embodiment, the subcarriers that have their power reduced are those subcarriers that are proximate to frequency span of uplink channel 112 or at the edges of the transmission bandwidth configuration. This increases the guard band 416 between the channels to an effective guard band 418. The network equipment 110 can also adjust 708 the power of at least one subcarrier of the control region for uplink channel 112 of subframe 424. In order to reduce the desensing that may occur between channel 112 and 404, the network equipment requests a reduction of power in a plurality of subcarriers of the frequency span of uplink channel 112 that are proximate to the frequency span of downlink channel 404.

In another embodiment, a determination can be made as to the origination of the interference between the uplink and downlink carriers. The interference may not be caused just by subcarriers on one of the channels that are proximate to subcarriers that are on the other of the channels. Interference can be caused by any of the subcarriers within a channel. Based on the determination of the subcarriers that are causing the interference, the network equipment can adjust the power of the identified subcarriers so that they contribute less to the interference.

The adjustment that reduces the power for designated subcarriers can increase the guard band 416 and together with the reduced power in downlink channel 404 and effective guard band 418 is created. As can be understood, by reducing the power level in a plurality of subcarriers in a given frequency span that are proximate to the subcarriers in another frequency span, the bandwidth of a uplink and a downlink channel can be reduced from 10 MHz to, for example, 5 MHz to create the effective guard band. In addition to reducing power in given subcarriers, the network equipment and the user equipment can allocate data to only certain subcarriers in the given bandwidths. In another embodiment, network equipment interference originating from other network equipment can also be addressed by modifying the power levels of designated subcarriers in the downlink channels.

As explained, the power levels on one or both of the uplink and downlink channels can be reduced to a minimum as required to help alleviate the desensing between the uplink and downlink channels for the communication between the network equipment 110 and one of the user equipment 102. An indicator can be used on the uplink scheduling grant to modify the power states of the user equipment for a subframe. The indicator can be used in the downlink scheduling grant of subframe n−4 426 so that the user equipment knows in advance the received transmission bandwidth configuration of the downlink channel n 424. The indicator can be used in the uplink scheduling grant of subframe n–4 426 so that the user equipment knows in advance the transmission bandwidth configuration to use on the uplink channel n 424 and that is expected to be received by the network equipment in that subframe. A prolonged power state modification might be due to a timing advance or the network equipment's knowledge that it will schedule multiple downlink subframes to a user equipment. Therefore, the uplink power state is to remain in a modified condition for more than one subframe. In addition, there can be switching between two different open loop power levels depending on whether the downlink and the uplink for the user equipment are scheduled for a given subframe. An indicator or even a single bit can be used in the grant to explicitly switch between two open loop power levels on the uplink. The uplink power levels can be reduced on specific subframes with only small performance losses.

As described, the power levels of subcarriers within a frequency span for a subframe can be adjusted. In an embodiment, this can be effectuated using energy per resource elements where the resource elements are part of the subcarriers.

Figure 8:
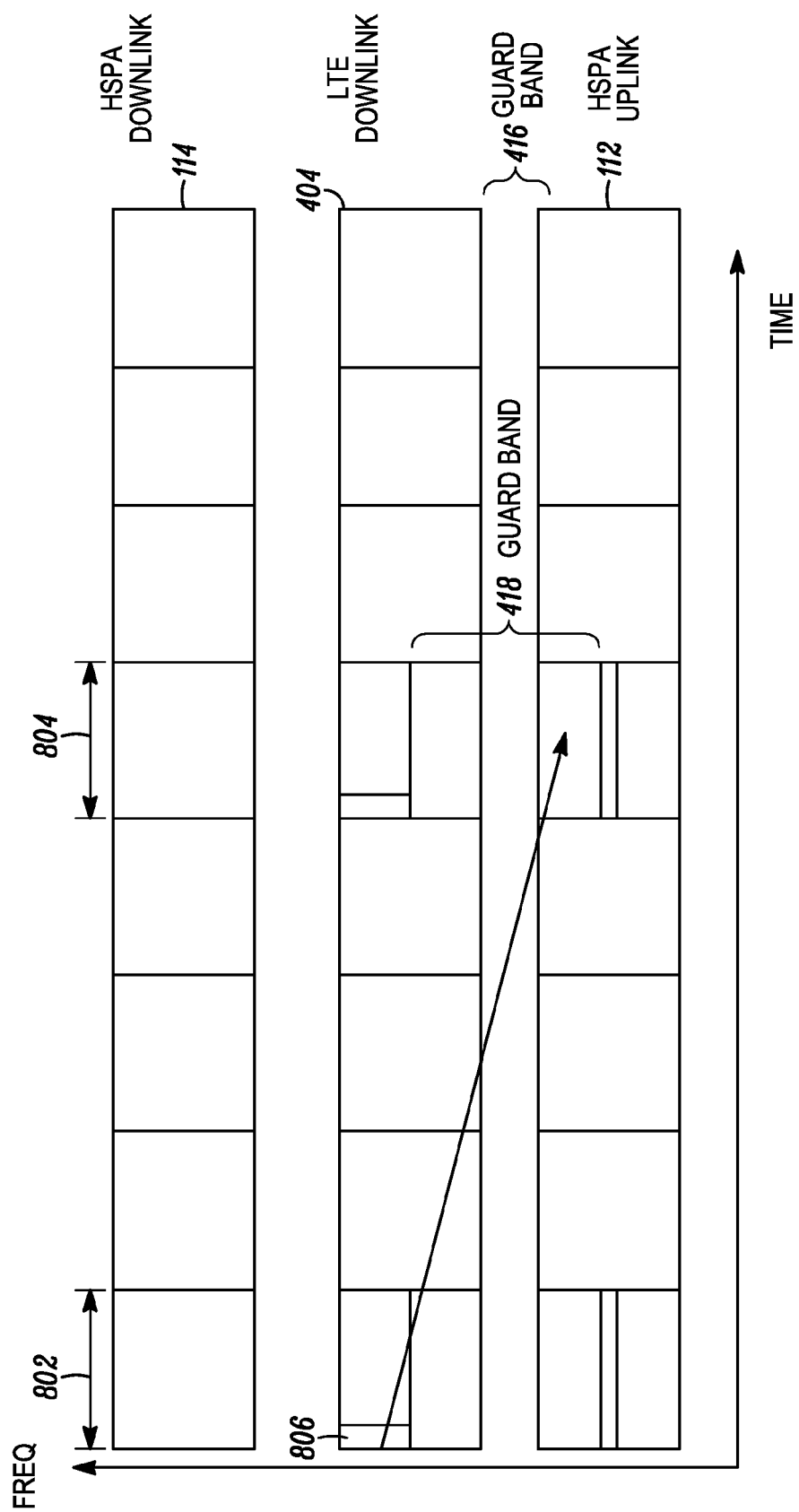
FIG. 8 is a block diagram of uplink/downlink configuration of a TDD carrier that is transmitted on two different transmission bandwidth configurations used in accordance with some embodiments of the invention.

FIG. 8 is a block diagram of an FDD pair (e.g., downlink channel 114 and uplink channel 112) where the FDD carrier is transmitted on two different transmission bandwidth configurations where one bandwidth configuration is used for an uplink channel 112 and the other bandwidth configuration is used for a downlink channel 114. In addition, at least an additional transmission bandwidth configuration can be provided for an additional downlink channel 404. In the embodiment shown, the radio access technology can be different for each of the uplink and downlink channels. For example, the uplink channel 112 and downlink channel 114 can be a frequency pair that uses a first type of radio access technology such as HSPA while the downlink channel 404 can use a second type of radio access technology such as LTE. The arrangement of the uplink channel 112 and downlink channel 404 is such there is a reduced guard band 416 that can cause interference and desensing between the channels regardless of the radio access technology used for each of the uplink and downlink channels.

Similar to the descriptions given above, each channel 112, 114, 404 include a series of subframes 802, 804 in the time domain where the subframes in each channel 112, 404 use different transmission bandwidth configurations to transmit and receive subcarriers between network equipment 110 and user equipment 102. The use of a control region 806 in subframes n–4 802 can be used to schedule the transmission of data in subframe n 804, and an indicator in the control region can be used to set the transmission bandwidth of subframe's n 804 transmission bandwidth configuration in which subcarriers will be allocated in the channels 112 and 404 so that an effective guard band 418 is configured in the subframe n 804. As each of the transmission bandwidth configurations use a different radio access technology, the use of an indicator or grant in one radio access technology can be used to configure the transmission bandwidth and other parameters for the transmission bandwidth configurations used in a different radio access technology.

For example, an HSPA indicator allocated in a control region 806 of subframe n–4 802 for channel 404 can be used to determine the transmission bandwidth or set other parameters (e.g., Downlink Control Information (DCI) Format contents such as Modulation and Coding Scheme, Resource allocation, Redundancy Version, New Data Indicator, etc) of subframe n 804 in channel 112 or 404 that is operated according to LTE. In addition, an LTE indicator allocated in a control region 806 in subframe n–4 804 for channel 404 can be used to determine the bandwidth or set other parameters of subframe n 804 in channel 112 that is operated according to HSPA. The HSPA indicator or LTE indicator can be one of the uplink scheduling grant, downlink scheduling grant, bit map or other designation used to set parameters in the control region or data region of the subframe 804.

The scheduling grant can for instance, include a field that indicates whether the grant contents correspond to the first type of RAT, second type of RAT, or both type of RATs. For instance, this may be achieved by inclusion of an explicit RAT-Indicator-Function (RIF) within the scheduling grant. An illustration of scheduling grant is shown in the Table 1 where the 57 total bits of grant include two bits of RIF, and up to 55 bits of grant for each potential RAT type scheduled via the grant.

TABLE 1

| Field identifier | Number of bits |
| --- | --- |
| Radio-Access-Technology Indicator (RIF) | 0, 1 or 2 |
| GRANT for RAT | 55 |
| Total | 57 |

If the RIF field has 0 bits, then the grant defaults to the baseline case where no cross-RAT scheduling is possible. If the RIF field has 1 bit, then if the field value=0, then the Grant corresponds to a first type of RAT (e.g., HSPA), and if the field value=1, then the Grant may correspond to a second type of RAT (e.g., LTE).

Note it is also possible to create hybrid grants that assign resources on the HSPA and LTE carrier simultaneously. For instance, if the RIF field has 1 bit, then if the field value=0, then the Grant may correspond to a grant on a first type of RAT (e.g., HSPA) only, and if the field value=1, then the Grant may contain fields scheduling resources on both the first and second type of RATs (e.g., HSPA and LTE). For the example shown in Table 2, if the RIF has one bit, and then if the grant corresponds to an LTE downlink grant, the Grant may be interpreted as follows. The Special Information may be additional information that is optionally used for second or third transmissions of the transport block. The optional padding bits are as the name indicates padding bits that may be used to align the grant sizes for the HSPA and LTE grants. Note that other fields such as pre-coding vectors, Multiple-Input Multiple-Output (MIMO) information, etc may also be present.

TABLE 2

| Field identifier | Number of bits |
| --- | --- |
| Radio-Access-Technology Indicator | 1 |
| LTE Resource allocation header | 1 |
| LTE Resource Block assignment | 25 |
| LTE Modulation and Coding Scheme (MCS) | 5 |
| LTE HARQ process number | 3 |
| LTE New Data Indicator | 1 |
| LTE RV (Redundancy Version) | 2 |
| LTE Transmit Power Control (TPC) command for PUCCH | 2 |
| LTE CRC (scrambled with Rel-8 C-RNTI) | 16 |
| LTE Special Information | 0 |
| Optional Padding Bits | 0 |
| Total | 57 |

In the example shown in Table 3, if the grant corresponds to an HSPA grant, the Grant may be interpreted as follows. The Special Information may be additional information that is optionally used for second or third transmissions of the transport block. The optional padding bits are as its name indicates, padding bits that may be used to, for example, align the grant sizes for the HSPA and LTE grants. Note that other fields such as pre-coding vectors, Multiple-Input Multiple-Output (MIMO) information, etc. may also be present.

TABLE 3

| Field identifier | Number of bits |
|---|---|
| Radio-Access-Technology Indicator | 1 |
| HSPA Channelization-code-set information | 7 |
| HSPA Modulation Scheme (MCS) | 1 |
| HSPA Transport block Size information | 6 |
| HSPA HARQ information | 3 |
| HSPA New Data Indicator | 1 |
| HSPA RV (Redundancy Version) and constellation version | 2 |
| HSPA CRC (scrambled with H-RNTI) | 16 |
| HSPA Special Information | 6 |
| Optional Padding bits | 13 |
| Total | 57 |

Thus, the indicator can indicate whether resources are assigned on, or for, the first type of RAT or the second type of RAT. In another embodiment, the UE may receive via higher-layer signaling a bitmap, wherein the bitmap indicates a set of subframes when the first RAT is active, and a set of subframes wherein the second RAT is active. The first RAT can be active in a first transmission bandwidth configuration and the second RAT can be active in a second transmission bandwidth configuration. Typically the subframe duration of the first RAT and the subframe of the second RAT may not always be aligned or be of equal duration. For instance, the LTE RAT may have a subframe duration of 1 ms, whereas the HSPA subframe may be of 2 ms duration or of 10 ms duration.

In some instances, the bitmap may be used to signal the transmit time interval (TTI) for each RAT. The bitmap may also be used as an indicator to the UE of the subframes where the UE can implement cancellation of certain channels of the second RAT from the reception of the first RAT. For instance, if certain subframes or TTIs of the HSPA RAT are blank or almost blank (loaded with very little HSPA signals, only C-PICH), then that information may be used by the LTE UE to adapt its receiver to account for, minimize, or cancel the interference caused by the HSPA signals to the LTE receiver.

Yet another method is disclosed. In this method, a message is received, wherein the message indicates a control region bandwidth pattern for a sequence of subframes. Then control signaling is received in the sequence of sub frames based on the received signaling, wherein the control region bandwidths of at least two subframes is different.

Figure 9:
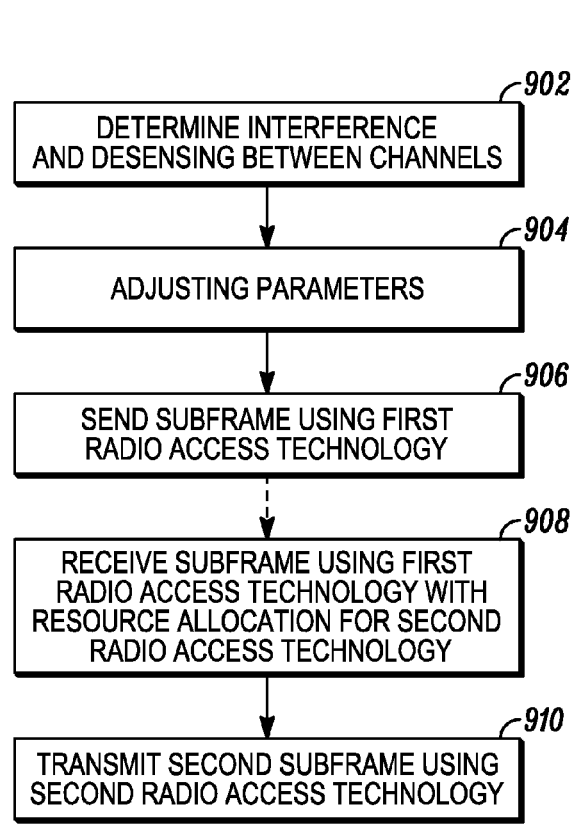
FIG. 9 is a flow diagram of scheduling subframes to reduce desensing in the transmission bandwidth configuration used in accordance with some embodiments of the invention.

Turning to FIG. 9, a flow chart 900 is illustrated that demonstrates the method of scheduling subframes using different radio access technologies. The method described in FIG. 9 begins by determining 902 that there will be interference between the uplink and downlink channels that will cause desensing in subsequent subframe 804. In response to determining the interference, the network equipment can adjust 904 a parameter for subframe 804 in one of the channels. For example the network equipment can adjust the transmission bandwidth of one or both of the uplink channel and downlink channel for subframe 804 where the adjusted transmission bandwidth is the bandwidth within the transmission bandwidth configuration where subcarriers will be allocated in the control region and the data region. In view of the discussion in connection with FIG. 8, the network equipment 110 can use an indicator in control region 806 of subframe 802 using of a first access technology, such as LTE, in a first channel to schedule the subframe 804 that uses a second radio access technology such as HSPA in a second channel. The network equipment transmits 906 the indicator to the user equipment using, for example, LTE, as the radio access technology. In another embodiment, the principles described can be performed when the first radio access technology such as HSPA is different than the second radio access technology such as LTE.

As can be appreciated, the user equipment 102 can be dual mode device that has an LTE and HSPA transceiver. At the user equipment, the control region of a first subframe is received 908 in a downlink channel having a given transmission bandwidth for the transmission bandwidth configuration of the channel. The downlink channel is received using the LTE transceiver and includes an indicator of the resource allocation of subcarriers for use in the uplink channel. The indication of resource allocation designates to the user equipment how resources are allocated on the downlink channel for subframe 804 as well as how to allocate resources in the uplink channel in subframe 804 that uses HSPA as the radio access technology. The user equipment transmits 910 a second control region in subframe 804 on a second channel having a different given transmission bandwidth. In order to take advantage of the different radio access technologies, an indicator that can be a part of an uplink control grant, downlink control grant or bit map used to schedule subframe 804 that uses the first type of radio access technology is transmitted in the control region of the second frequency span.

In an alternative embodiment, the grant that is found in subframe 802 of a first transmission bandwidth configuration using the first radio access technology is used to schedule the parameters such as transmission bandwidth in subframe 804 in the second transmission bandwidth configuration using the second radio access technology. The use of the an indicator using a first radio access technology to adjust the parameters of a channel using a second radio access technology can reduce the desensing between the uplink and downlink channels in subframe 804.

Figure 10:
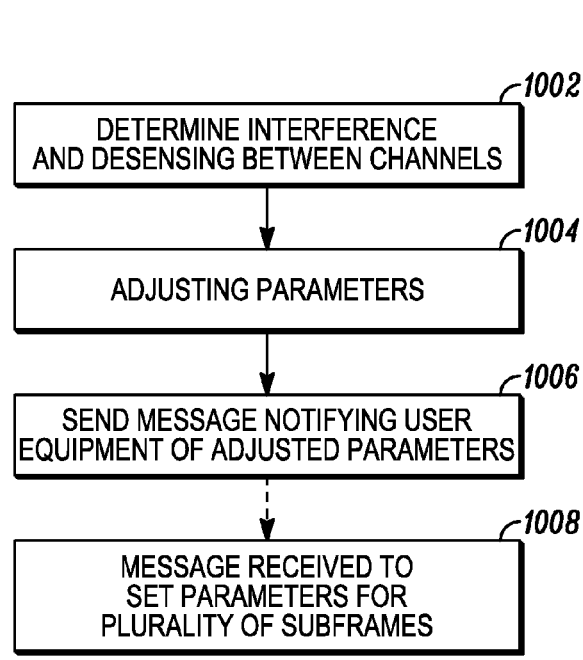
FIG. 10 is a flow diagram of scheduling subframes to reduce desensing the transmission bandwidth configuration used in accordance with some embodiments of the invention.

FIG. 10 illustrates another method 1000 of allocating the transmission bandwidth of the transmission bandwidth configurations that are used as uplink channel 112 and downlink channel 404. As can be understood from the descriptions provided above, the allocation of transmission bandwidth to reduce desensing can be done dynamically such that the transmission bandwidths for the different transmission bandwidths can be modified on a subframe-by-subframe basis. Thus, each transmission bandwidth configuration for each subframe can have a different transmission bandwidth. In an alternative embodiment, the transmission bandwidth for transmission bandwidth configurations can semi-static or semi-persistent for a plurality of subframes.

The method described in FIG. 10 begins by determining 1002 that there will be interference between the uplink and downlink channels that will cause desensing in at least one of a plurality of subsequent subframes. In response to determining the interference, the network equipment can adjust 1004 a parameter for a plurality of subsequent subframes 804. In an embodiment, the adjustment can be for the transmission bandwidth of the transmission bandwidth configuration of one or both of the uplink channel 112 or downlink channel 404. In an embodiment, the adjustment can be made for a plurality of subsequent subframes such that each of the subsequent subframes uses the same transmission bandwidth of the transmission bandwidth configuration for the channel. After determining the adjustment to the transmission bandwidth, a message can be sent 1006 from the network equipment 110 to the user equipment 102 that notifies user equipment of the adjusted transmission bandwidth for at least one of the uplink channel 112 and downlink channel 404. As is understood, the message sets the transmission bandwidth for the uplink channel or downlink channel for a plurality of subsequent subframes. The message is received 1008 by the user equipment and sets the transmission bandwidth for the plurality of subframes. In an embodiment, the adjusted bandwidth can be for the control region of the subframes 804 or for the control and data regions of the subframes 804.

The message can include at least one bit to designate the transmission bandwidth used to allocate subcarriers in the transmission bandwidth configuration of the uplink and downlink channels. The bit can indicate the radio resource configuration of the control region in the subframe 804. As is understood, the radio resource configuration can set the bandwidth pattern for the uplink or downlink channels' control region for a plurality of subsequent subframes. In other words, the message can provide a block grant for the transmission bandwidth. It can also be understood that as a semi-static or semi-persistent method, the message can be provided as a part of a layer 2 or layer 3 communication between the network equipment and the user equipment.

The above descriptions of scheduling and detecting the schedule of subframes across different frequency spans have been given in relation to a single carrier unless otherwise noted. It is understood that the principles described can apply in carrier aggregation as well as cross carrier scheduling.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method comprising:
   receiving a first control channel in a first subframe as a part of wireless communication between a user equipment and a network equipment using a first type of radio access technology wherein the first control channel includes a first scheduling grant for scheduling resources in a second subframe using a second type of radio access technology;
   receiving a second control channel in the first subframe using the first type of radio access technology wherein the second control channel includes a second scheduling grant for the scheduling resources in the first subframe using the first type of radio access technology;
   receiving a third control channel in the second subframe wherein the third control channel is configured according to the first scheduling grant.

2. The method of claim 1 wherein the grant includes a radio access technology indicator function.

3. The method of claim 1 wherein the first type of radio access technology is an HSPA radio technology and the second type of radio access technology is a long term evolution radio technology.

4. The method of claim 1 wherein the first type of radio access technology is a long term evolution radio technology and the second type of radio access technology is a HSPA radio technology.

5. An apparatus comprising:
   a transceiver for receiving a first control channel in a first subframe using a first type of radio access technology wherein the first control channel includes a first scheduling grant for scheduling resources in a second subframe using a second type of radio access technology, for receiving a second control channel in the first subframe using the first type of radio access technology wherein the second control channel includes a second scheduling grant for scheduling resources in the first subframe using the first type of radio access technology, and for receiving a third control channel in the second subframe wherein the third control channel is configured according to the first scheduling grant;
   a processor coupled to the transceiver wherein the processor is configured to process the first scheduling grant and the second scheduling grant to detect resource allocation for a second type of radio access technology and a first type of radio access technology.

6. The apparatus of claim 5 wherein the grant includes a radio access technology indicator function.

7. The apparatus of claim 5 wherein the first type of radio access technology is an HSPA radio technology and the second type of radio access technology is a long term evolution radio technology.

8. The apparatus of claim 5 wherein the first type of radio access technology is a long term evolution radio technology and the second type of radio access technology is a HSPA radio technology.

* * * * *